(12) United States Patent
Hayashi et al.

(10) Patent No.: US 9,254,811 B2
(45) Date of Patent: Feb. 9, 2016

(54) VEHICLE SIDE-AIRBAG DEVICE

(75) Inventors: Shigeki Hayashi, Kasugai (JP); Satoshi Fukushima, Toyota (JP); Shinobu Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/405,029

(22) PCT Filed: Jun. 6, 2012

(86) PCT No.: PCT/JP2012/064570
§ 371 (c)(1),
(2), (4) Date: Dec. 2, 2014

(87) PCT Pub. No.: WO2013/183130
PCT Pub. Date: Dec. 12, 2013

(65) Prior Publication Data
US 2015/0239423 A1    Aug. 27, 2015

(51) Int. Cl.
*B60R 21/233* (2006.01)
*B60R 21/2338* (2011.01)
*B60R 21/231* (2011.01)
*B60R 21/00* (2006.01)

(52) U.S. Cl.
CPC ......... *B60R 21/23138* (2013.01); *B60R 21/231* (2013.01); *B60R 21/233* (2013.01); *B60R 21/2338* (2013.01); *B60R 2021/0041* (2013.01); *B60R 2021/0058* (2013.01); *B60R 2021/23146* (2013.01); *B60R 2021/23308* (2013.01); *B60R 2021/23324* (2013.01); *B60R 2021/23382* (2013.01)

(58) Field of Classification Search
CPC ............ B60R 21/23138; B60R 21/231; B60R 21/233; B60R 21/2338; B60R 2021/23146; B60R 2021/0041; B60R 2021/0044; B60R 2021/0058; B60R 2021/23308; B60R 2021/23316; B60R 2021/23324; B60R 2021/23382; B60R 2021/0006; B60R 2021/0009
USPC .............. 280/730.1, 730.2, 729, 743.1, 743.2
See application file for complete search history.

(56) References Cited

U.S. PATENT DOCUMENTS

| | | | |
|---|---|---|---|
| 2003/0168836 A1 | 9/2003 | Sato et al. | |
| 2006/0022441 A1* | 2/2006 | Hayashi | B60R 21/207 280/730.2 |
| 2007/0170707 A1 | 7/2007 | Sato et al. | |
| 2012/0175925 A1 | 7/2012 | Suzuki et al. | |
| 2013/0033022 A1 | 2/2013 | Yamamoto | |
| 2013/0229003 A1* | 9/2013 | Fukawatase | B60R 21/207 280/730.2 |

FOREIGN PATENT DOCUMENTS

| | | |
|---|---|---|
| JP | A-2000-280853 | 10/2000 |
| JP | A-2004-58860 | 2/2004 |

(Continued)

*Primary Examiner* — Keith Frisby
(74) *Attorney, Agent, or Firm* — Oliff PLC

(57) ABSTRACT

In an inflated and deployed state of a side-airbag, a shoulder bag section is disposed to extend from the side of a shoulder of a seated occupant toward the vehicle front side, above a main bag section. The vehicle width direction dimension of the shoulder bag section is set smaller than that of the main bag section, and a vehicle width direction inner side face at an upper end side of the main bag section slopes or curves so as to rise on progression toward the vehicle width direction outer side. An upper arm is pushed upward by making sliding contact with this face. Moreover, the shoulder can be restrained by the shoulder bag section, even when the seated occupant moves under inertia obliquely toward the vehicle front.

20 Claims, 13 Drawing Sheets

(56) References Cited

FOREIGN PATENT DOCUMENTS

| JP | A-2004-217184 | 8/2004 |
| JP | A-2005-186891 | 7/2005 |
| JP | A-2009-190830 | 8/2009 |
| JP | A-2010-132072 | 6/2010 |
| JP | A-2011-240807 | 12/2011 |
| WO | WO 2011/087026 A1 | 7/2011 |
| WO | WO 2011/132316 A1 | 10/2011 |

* cited by examiner

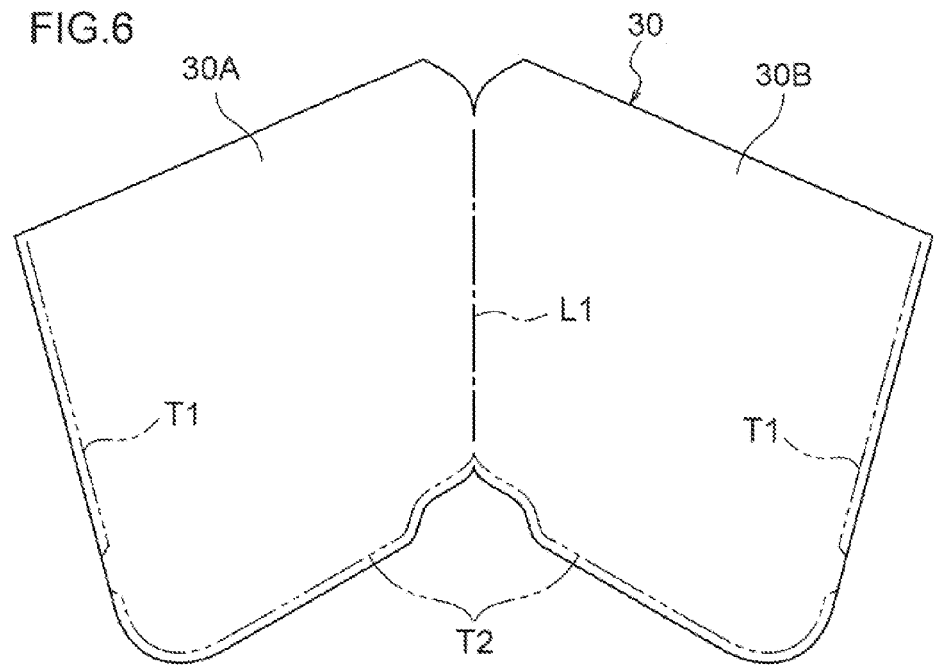
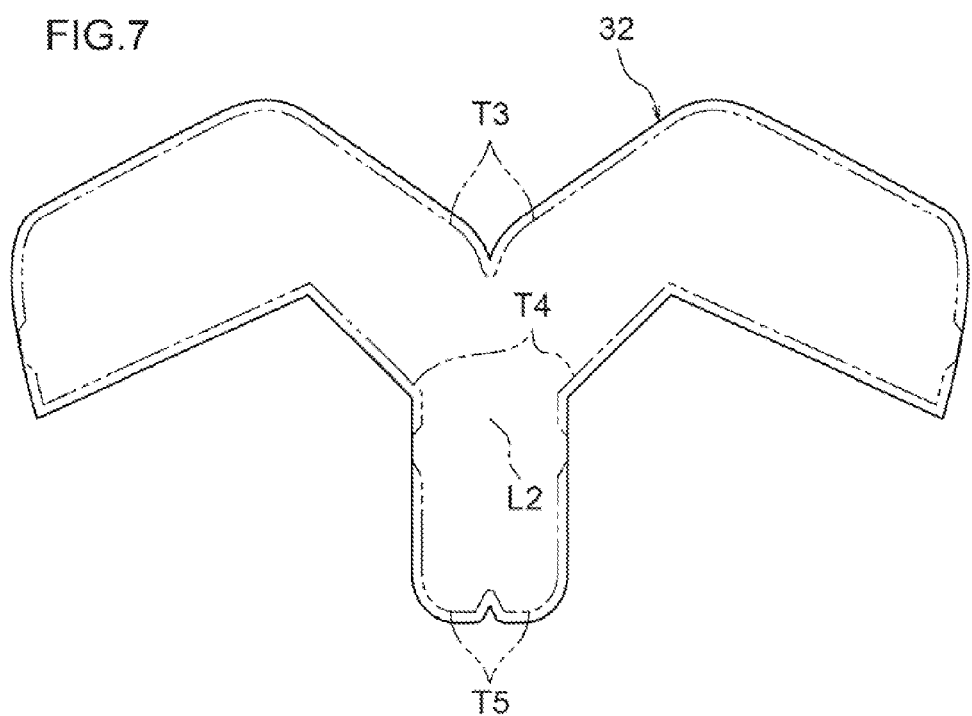

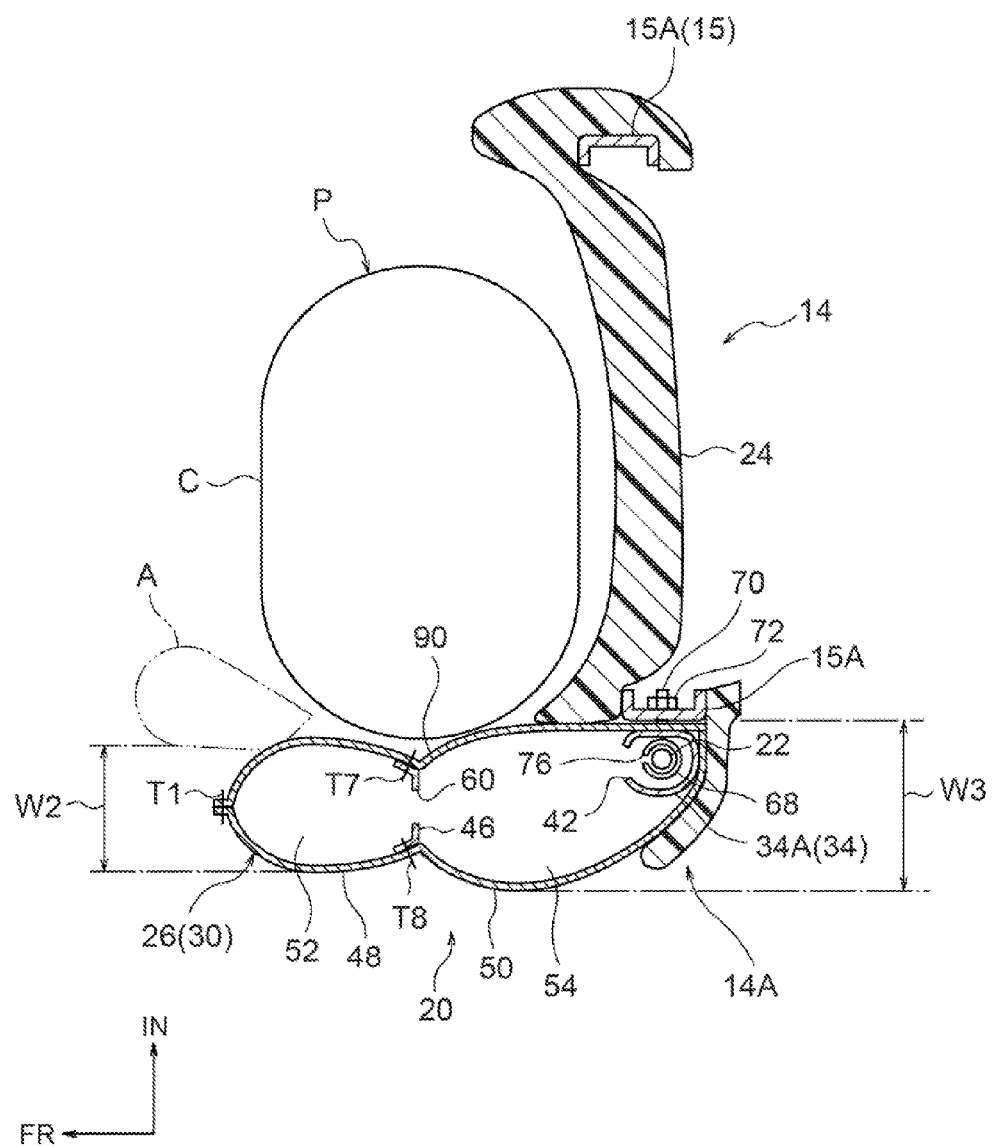

VEHICLE SIDE-AIRBAG DEVICE

TECHNICAL FIELD

The present invention relates to a vehicle side-airbag device.

BACKGROUND ART

In a vehicle side-airbag device described in Patent Document 1, an airbag in an inflated and deployed state is provided with a rear side tube bag section extending in the up-down direction further to the vehicle rear side than a vehicle width direction outer side end of the chest of a seated occupant, and a front side tube bag section extending in the up-down direction positioned more to the vehicle front side than the rear side tube bag section and more to the vehicle front side than the vehicle width direction outer side end of the chest of the seated occupant. An upper portion of the rear side tube bag section configures a shoulder restraining section that is positioned at a shoulder side of the seated occupant and restrains the shoulder, and an upper end of the front side tube bag configures an arm support section that is positioned further to the vehicle front side than the shoulder restraining section and lower than an underarm of the seated occupant, and on which the upper arm of the seated occupant rests.

Namely, in the above vehicle side-airbag device, the shoulder of the seated occupant that has relatively high resilience is restrained by the shoulder restraining section, and the upper arm is inhibited from coming between the chest of the seated occupant that has relatively low resilience and the airbag, by resting the upper arm of the seated occupant on the arm support section.

RELATED DOCUMENTS

Patent Documents

Japanese Patent Application Laid-Open (JP-A) No. 2010-132072

SUMMARY OF INVENTION

Technical Problem

However, in cases in which the side face collision mode is what is referred to as an oblique side face collision, the seated occupant sometimes moves under inertia obliquely toward the vehicle front. In such cases, the shoulder of the seated occupant becomes separated from the shoulder restraining section, and there is a possibility that restraint of the shoulder of the seated occupant is not maintained as far as the latter part of the collision.

In consideration of the above circumstances, an object of the present invention is to obtain a vehicle side-airbag device that can inhibit an upper arm of a seated occupant from coming between the chest of the seated occupant and a side-airbag, and can favorably restrain a shoulder of the seated occupant using the side-airbag, regardless of the side face collision mode.

Solution to Problem

A vehicle side-airbag device of a first aspect of the invention includes an inflator that is provided at a vehicle seat and is operated to generate gas in cases in which a side face collision of the vehicle is detected or predicted, and a side-airbag that is provided at a side portion of a seatback of the vehicle seat, that inflates and deploys between a seated occupant and a vehicle body side portion due to gas generated by the inflator being supplied inside the side-airbag, that is partitioned in an inflated and deployed state, into a shoulder bag section extending from a side of a shoulder of the seated occupant toward a vehicle front and a main bag section positioned at a side of a chest and abdomen of the seated occupant, and that has a vehicle width direction dimension of the shoulder bag section set smaller than that of the main bag section, such that a vehicle width direction inner side face at an upper end side of the main bag section is sloped or curved so as to rise on progression toward the vehicle width direction outer side.

In the first aspect, the positional relationship between the seated occupant and the side-airbag is set based on, for example, the positional relationship between a World Side Impact Dummy (WorldSID) seated in a vehicle seat, and a side-airbag.

In the first aspect, in cases in which a side face collision of the vehicle is detected or predicted, the inflator is operated to generate gas, and gas is supplied inside the side-airbag. The side-airbag thereby inflates and deploys between the seated occupant and the vehicle body side portion. The side-airbag is partitioned into the shoulder bag section extending from at the side of the shoulder of the seated occupant toward the vehicle front, and the main bag section positioned at the side of the chest and abdomen of the seated occupant in the inflated and deployed state, and has the vehicle width direction dimension (inflated dimension) of the shoulder bag section set smaller than that of the main bag section. The vehicle width direction inner side face at the upper end side of the main bag section is sloped or curved in the inflated and deployed state so as to rise on progression toward the vehicle width direction outer side.

The side-airbag and the seated occupant approach each other relatively due to the impact of the side face collision, and the sloped or curved face thereby makes sliding contact with the upper arm of the seated occupant, generating a force that pushes the upper arm upward. The upper arm is accordingly pushed upward above the main bag section, and restrained by the shoulder bag section. The upper arm can thereby be inhibited from coming between the chest of the seated occupant and the side-airbag.

As previously described, the shoulder bag section inflates and deploys so as to extend from at the side of the shoulder of the seated occupant toward the vehicle front. This thereby enables a configuration in which the shoulder of the seated occupant does not separate from the shoulder bag section, even, for example, in cases in which the side face collision mode is an oblique side face collision, and the seated occupant moves under inertia obliquely toward the vehicle front. This enables the shoulder of the seated occupant to be favorably restrained by the side-airbag, regardless of the side face collision mode.

According to a vehicle side-airbag device of a second aspect of the invention in the first aspect, wherein the main bag section is partitioned into a front bag section and a rear bag section aligned in the inflated and deployed state in a row along a vehicle front-rear direction.

In the second aspect, the front bag section and the rear bag section provided at the main bag section enable the side face of the chest and abdomen of the seated occupant to be restrained by being covered from the front and rear along the curved portion thereof. This enables the positional relationship in the vehicle front-rear direction between the chest and the abdomen, and the side-airbag to be stabilized.

According to a vehicle side-airbag device of a third aspect of the invention in the second aspect, wherein the shoulder bag section and the main bag section are partitioned by a tether or a stitched portion extending in the inflated and deployed state along the vehicle front-rear direction, and a boundary between the shoulder bag section and the main bag section in the inflated and deployed state is formed so as to be positioned further to a lower side than a center of the shoulder of the seated occupant and further to an upper side than an underarm of the seated occupant as viewed from the vehicle width direction.

Note that the position of "the center of the shoulder" above is, for example, the position of a center (axial center) of a bolt provided at a shoulder of a World Side Impact Dummy seated in a vehicle seat. Moreover, the position of "underarm" above is, for example, the position of a lower end of a rear end portion (shoulder) of an upper arm of the World Side Impact Dummy seated in the vehicle seat when the upper arm is extended horizontally toward the vehicle front.

In the third aspect, since the tether or the stitched portion partitioning the shoulder bag section and the main bag section is set at the boundary between the shoulder bag section and the main bag section, the vehicle width direction inner side face of the side-airbag in the vicinity of the boundary forms a recess toward the vehicle width direction outer side with the side-airbag in the inflated and deployed state. This enables the vehicle width direction inner side face at the upper end side of the main bag section to slope or to curve greatly so as to rise on progression toward the vehicle width direction outer side. Moreover, with the airbag in the inflated and deployed state, the boundary is positioned further to the lower side than the center of the shoulder and further to the upper side than the underarm of the seated occupant, viewed from the vehicle width direction. The side-airbag and the seated occupant approach each other relatively due to the impact of the side face collision, and the sloped or curved face thereby makes sliding contact with the lower side portion at the side face of the shoulder, generating a force that pushes the shoulder upward. Since the shoulder can be pushed upward in this way, pushing up of the upper arm can be assisted.

According to a vehicle side-airbag device of a fourth aspect of the invention in the third aspect, wherein the front bag section and the rear bag section are partitioned by a tether or a stitched portion extending in the inflated and deployed state along a vehicle up-down direction and a boundary between the front bag section and the rear bag section in the inflated and deployed state is formed so as to face a front-rear direction intermediate portion of the chest of the seated occupant.

In the fourth aspect, since the tether or the stitched portion partitioning the main bag section into the front bag section and the rear bag section is set at the boundary between the front bag section and the rear bag section, the vehicle width direction inner side face of the side-airbag in the inflated and deployed state forms a recess toward the vehicle width direction outer side in the vicinity of the boundary. By fitting the front-rear direction intermediate portion of the side face of the chest (namely, a portion that projects out the most toward the vehicle width direction outer side; the front-rear direction center portion or the vicinity of the front-rear direction center portion) into the recess, the positional relationship in the vehicle front-rear direction between the chest and the side-airbag can be favorably stabilized, and the load on the chest (such as the ribs) can be reduced.

According to a vehicle side-airbag device of a fifth aspect of the invention in the second or the fourth aspect, wherein a vehicle width direction dimension of the rear bag section is greater than the front bag section in the inflated and deployed state.

In the fifth aspect, the rear side of the chest and the abdomen that have relatively high resilience can be restrained by the rear bag section that has greater vehicle width direction dimension (inflated thickness) in the inflated and deployed state than the front bag section, and the front side of the chest and the abdomen that have relatively low resilience can be restrained by the front bag section. This enables sites on the body of the seated occupant that have relatively high resilience to be effectively restrained, while reducing load at sites that have relatively low resilience. This enables occupant restraint performance by the side-airbag to be improved.

According to a vehicle side-airbag device of a sixth aspect of the invention in any one of the first aspect to the fifth aspect, wherein the side-airbag is configured such that an internal pressure of the shoulder bag section is higher than an internal pressure of the main bag section in the inflated and deployed state.

In the sixth aspect, in the inflated and deployed state of the side-airbag, the internal pressure of the shoulder bag section restraining the shoulder of the seated occupant that has relatively high resilience is configured to be higher than the internal pressure of the main bag section restraining the chest and abdomen of the seated occupant that have relatively low resilience. This enables sites on the body of the seated occupant that have relatively high resilience to be effectively restrained, while reducing load at sites that have relatively low resilience. This enables occupant restraint performance by the side-airbag to be improved.

According to a vehicle side-airbag device of a seventh aspect of the invention in any one of the first aspect to the sixth aspect, wherein a vent hole is formed at both the shoulder bag section and the main bag section to externally discharge gas that has been supplied inside.

In the seventh aspect, individually changing the setting of the size of the vent hole formed to both the shoulder bag section and the main bag section enables easy adjustment of the internal pressure of each bag section, independently of each other.

According to a vehicle side-airbag device of an eighth aspect of the invention in the second aspect, wherein the side-airbag includes an inner tube positioned at a vehicle rear side of the rear bag section in the inflated and deployed state, the inflator is provided inside the inner tube, an upper portion of the inner tube configures a gas introduction portion to the shoulder bag section interior, a gas supply inlet at the rear bag section interior is formed at an up-down direction intermediate portion of the inner tube, and both upper end sides and lower end sides of the front bag section interior and the rear bag section interior are in communication with each other.

In the eighth aspect, since the inflator is provided inside the inner tube that places the shoulder bag section interior and the rear bag section interior in communication with each other, gas generated by the inflator can be smoothly supplied to the shoulder bag section interior and the rear bag section interior. This enables the shoulder bag section and the rear bag section to be quickly inflated and deployed, and enables the shoulder and the rear side of the chest and abdomen of the seated occupant that have relatively high resilience to be quickly restrained. Moreover, since the front bag section interior and the rear bag section interior are in communication with each other at both upper end sides and lower end sides thereof, gas supplied to the rear bag section interior can be smoothly supplied to the front bag section interior, enabling inflation and deployment of the front bag section to be promoted.

According to a vehicle side-airbag device of ninth aspect of the invention in the eighth aspect, wherein the front bag section and the rear bag section are partitioned by a tether extending along the vehicle up-down direction in the inflated and deployed state, an upper side communicating portion is provided between an upper end portion of the tether and the shoulder bag section and places the upper end side of the front bag section and the upper end side of the rear bag section in communication with each other, and an lower side communicating portion is provided between a lower end portion of the tether and a lower end portion of the main bag section and places the lower end side of the front bag section and the lower end side of the rear bag section in communication with each other, and an opening surface area of the upper side communicating portion is set larger than the lower side communicating portion in the inflated and deployed state as viewed in the vehicle front-rear direction.

In the ninth aspect, as viewed in the vehicle front-rear direction with the side-airbag in the inflated and deployed state, the opening surface area of the upper side communicating portion between the upper end portion of the tether and the shoulder bag section placing the front bag section and the rear bag section in communication with each other is set larger than the lower side communicating portion between the lower end portion of the tether and the lower end portion of the main bag section placing the front bag section and the rear bag section in communication with each other. This enables the inflated thickness of the portion of the main bag section above the tether to be increased, and enables deployment of this portion to be promoted. This enables, for example, the vicinity of the underarm of the upper arm of the seated occupant to be restrained by this portion, enabling the upward pushing behavior of the upper arm to be assisted.

According to a vehicle side-airbag device of a tenth aspect of the invention in the eighth aspect or the ninth aspect, wherein the front bag section and the rear bag section are partitioned by a tether extending along the vehicle up-down direction in the inflated and deployed state, the inflator is housed inside a diffuser provided inside the inner tube, and the gas supply port, a gas ejection port formed at the diffuser, and an opening formed at the tether are aligned in the inflated and deployed state in a row along a same straight line, and a vent hole that externally discharges gas inside the front bag section is formed at a vehicle front side end edge portion of the front bag section in the inflated and deployed state at an offset position below the opening.

In the tenth aspect, gas generated by the inflator is supplied to the rear bag section interior through the gas ejection port formed to the diffuser and the gas supply port formed to the inner tube, and supplied to the front bag section interior through the opening formed to the tether partitioning the front bag section and the rear bag section. Since the gas ejection port, the gas supply port, and the opening are aligned in a row along the same straight line (a hypothetical straight line) with the side-airbag in the inflated and deployed state, gas generated by the inflator can be smoothly supplied to the front bag section interior through the inside of the rear bag section. This enables deployment performance of the front bag section during initial operation of the inflator to be improved.

Moreover, the vent hole for externally discharging gas inside the front bag section is formed to the end edge portion at the vehicle front side of the front bag section in the inflated and deployed state, and the vent hole is formed at an offset position below the opening formed to the tether. This enables gas supplied to the front bag section through the opening formed to the tether to be inhibited from being directly (linearly) externally discharged through the vent hole, thereby enabling the internal pressure of the front bag section to be prevented from becoming too high, while improving the initial deployment performance of the front bag section.

According to a vehicle side-airbag device of an eleventh aspect of the invention in any one of the eighth to the tenth aspect, wherein the shoulder bag section extends in the inflated and deployed state from an upper end portion of the inner tube extending along the vehicle up-down direction toward the vehicle front side, and a brace shaped brace portion is inflated and deployed between the shoulder bag section and the inner tube.

In the eleventh aspect, supply of gas from the inflator provided inside the inner tube is prioritized to the shoulder bag section extending, in the inflated and deployed state of the side-airbag, from the upper end portion of the inner tube toward the vehicle front side. When the internal pressure of the shoulder bag section accordingly rises more than the internal pressure of the front bag section, there would be a possibility that a front portion side of the shoulder bag section displaces to the lower side, pushing the front bag section down toward the lower side. In cases in which the connecting portion between the shoulder bag section and the inner tube bends as a result, it would become difficult to deploy the side-airbag toward a set deployment position. However, in the present invention, the brace shaped brace portion is inflated and deployed between the shoulder bag section and the inner tube. This enables folding of the connecting portion to be prevented or effectively inhibited, enabling the deployment position of the side-airbag to be stabilized.

According to a vehicle side-airbag device of a twelfth aspect of the invention in the eleventh aspect, wherein the diffuser is fixed to a seatback frame provided at the seatback, and includes a supporting portion that supports a rear end edge of the inner tube further to the upper side than a lower end of the brace portion.

In the twelfth aspect, the diffuser fixed to the seatback frame includes the supporting portion that supports the rear end edge of the inner tube further to the upper side than the lower end of the brace portion. This enables bending of the inner tube at the vicinity of the connecting portion of the lower end of the brace portion and the inner tube to be prevented or effectively inhibited when the front portion side of the shoulder bag section attempts to displace toward the lower side. This enables the deployment position of the side-airbag to be more favorably stabilized.

According to a vehicle side-airbag device of a thirteenth aspect of the invention in the second aspect, wherein a pair of upper and lower tuck portions are formed at the rear bag section by folding back on each other in the vehicle front-rear direction both upper and lower end sides of a face of the rear bag section facing the vehicle width direction in the inflated and deployed state, and stitching.

In the thirteenth aspect, since the tuck portions are formed to the rear bag section, the vehicle width direction dimension (inflated thickness) of the rear bag section can be increased without changing the vehicle front-rear direction dimension of the rear bag section in the inflated and deployed state, or changing the position of the boundary between the front bag section and the rear bag section.

According to a vehicle side-airbag device of a fourteenth aspect of the invention in any one of the first aspect to the thirteenth aspect, wherein the up-down width dimension of the shoulder bag section in a deployed but not inflated state is set so as to decrease on progression toward the vehicle front side.

In the fourteenth aspect, in a deployed but not inflated state, namely, in a state of the shoulder bag section being deployed toward the seatback front side without being inflated, the up-down width dimension of the shoulder bag section is set as described above, such that the shoulder bag section inflates and deploys so as to narrow on progression toward the vehicle front side. This enables improved deployment performance (interposing ability) of the shoulder bag section into a narrow gap between the shoulder of the seated occupant and a vehicle body side portion. Moreover, a configuration is enabled in which unintended interference of the upper arm with the front portion side of the shoulder bag section is avoided when the upper arm of the seated occupant is pushed upward by making sliding contact with the upper end side of the main bag section, thereby enabling the upper arm to be pushed upward smoothly.

According to a vehicle side-airbag device of a fifteenth aspect of the invention in any one of the first aspect to the fourteenth aspect, wherein, in a state in which the seatback is positioned in a standard setting position and the side-airbag is in the inflated and deployed state, the side-airbag is formed such that an upper end of the main bag section slopes upward toward the front with respect to the vehicle front-rear direction.

Note that the "standard setting position" is the seatback position (reclining angle) specified in Side Barrier Impact Test Protocol (ECE R95) currently used in Japan and Europe, and Side Barrier Impact Test Protocol (FMVSS 214) currently used in the US, and ribs (rib bones) provided at the chest of the WorldSID leaning against the seatback are in a substantially horizontal position.

In the fifteenth aspect, the upper end of the main bag section slopes upward toward the front with respect to the vehicle front-rear direction with the side-airbag in the inflated and deployed state. This enables the point of action of an upward pushing force acting on the upper arm of the seated occupant by making sliding contact with the vehicle width direction inner side face at the upper end side of the main bag section (namely, the face that slopes or curves so as to rise on progression toward the vehicle width direction outer side) to be set further to the vehicle front side. This enables moment in the upward pushing direction acting on the upper arm to be increased, such that the upper arm can be pushed upward more favorably.

A vehicle side-airbag device of a sixteenth aspect of the invention includes an inflator that is provided at a vehicle seat and operates by generating gas in cases in which a side face collision of the vehicle is detected or predicted, and a side-airbag that is provided at a vehicle width direction outer side side portion of a seatback of the vehicle seat, that inflates and deploys toward a front side of the seatback due to gas generated by the inflator being supplied inside the side-airbag, that is partitioned in an inflated and deployed state into a shoulder bag section extending toward a vehicle front of an upper portion of the seatback and a main bag section positioned at a lower side of the shoulder bag section, and that has a vehicle width direction dimension of the shoulder bag section set smaller than that of the main bag section, such that a vehicle width direction inner side face at an upper end side of the main bag section is sloped or curved so as to rise on progression toward a vehicle width direction outer side.

Note that the "upper portion of the seatback" above refers to the upper portion when the seatback is divided into three equal portions, these being the upper portion, an up-down direction intermediate portion, and a lower portion.

In the sixteenth aspect, in cases in which a side face collision of the vehicle is detected or predicted, the inflator is operated to generate gas, and gas is supplied inside the side-airbag. The side-airbag thereby inflates and deploys from the vehicle width direction outer side side portion of the seatback toward the vehicle front side. The side-airbag is partitioned into the shoulder bag section extending in the inflated and deployed state from the upper portion of the seatback toward the vehicle front, and the main bag section positioned at the lower side of the shoulder bag section. This enables the shoulder of the seated occupant to be restrained by the shoulder bag section, and enables the chest and the abdomen of the seated occupant to be restrained by the main bag section.

In this side-airbag, the vehicle width direction dimension (inflated dimension) of the shoulder bag section is set smaller than that of the main bag section. The vehicle width direction inner side face at the upper end side of the main bag section is sloped or curved in the inflated and deployed state so as to rise on progression toward the vehicle width direction outer side. When the side-airbag and the seated occupant approach each other relatively due to the impact of the side face collision, the sloped or curved face thereby makes slides contact with the upper arm of the seated occupant, enabling a force to be generated that pushes the upper arm upward. The upper arm can accordingly be pushed upward above the main bag section and restrained by the shoulder bag section, enabling the upper arm to be inhibited from coming between the chest of the seated occupant and the side-airbag.

As previously described, the shoulder bag section inflates and deploys so as to extend toward the vehicle front of the upper portion of the seatback, such that the shoulder bag section can extend further toward the vehicle front than the shoulder of the seated occupant. The shoulder of the seated occupant can thereby be prevented from separating from the shoulder bag section, even, for example, in cases in which the side face collision mode is an oblique side face collision, and the seated occupant moves under inertia obliquely toward the vehicle front. This enables the shoulder of the seated occupant to be favorably restrained by the side-airbag, regardless of the side face collision mode Advantageous Effects of Invention As explained above, the vehicle side-airbag device according to the invention can inhibit an upper arm of a seated occupant from coming between the chest of the seated occupant and a side-airbag, and can favorably restrain a shoulder of the seated occupant using the side-airbag, regardless of the side face collision mode.

BRIEF DESCRIPTION OF DRAWINGS

FIG. 6 is an opened-out plan view illustrating a base cloth of a main bag section provided at the same side-airbag.

FIG. 7 is an opened-out plan view illustrating a base cloth of a sub-bag section provided at the same side-airbag.

FIG. 8 is an enlarged cross-section illustrating a cross-section taken along line F8-F8 in FIG. 1.

DESCRIPTION OF EMBODIMENTS

First Exemplary Embodiment

Explanation follows regarding a vehicle side-airbag device 10 according to a first exemplary embodiment of the invention, based on FIG. 1 to FIG. 12. Note that in each of the drawings, the arrow FR, the arrow UP and the arrow IN respectively indicate the vehicle front direction (the direction of progress), the vehicle upper direction, and the vehicle width direction inner side as appropriate. Unless specified otherwise, in the following explanation, simple use of front-rear and up-down directions respectively indicate the front-rear in the vehicle front-rear direction, and up-down in the vehicle up-down direction.

Configuration

Figure 1:
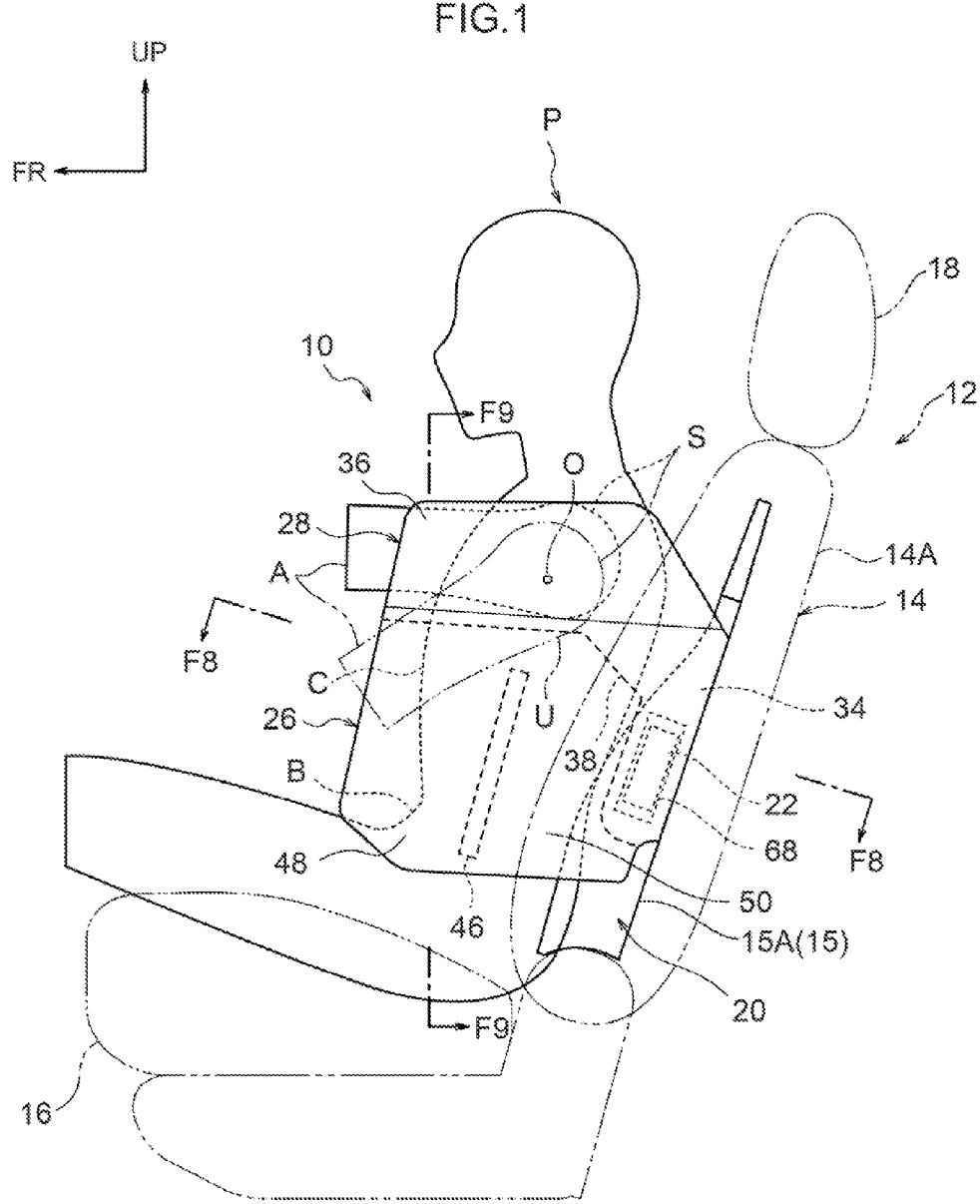
FIG. 1 is a side view of a vehicle seat mounted with a vehicle side-airbag device according to a first exemplary embodiment of the present invention, with a side-airbag in an inflated and deployed state.
Figure 9:
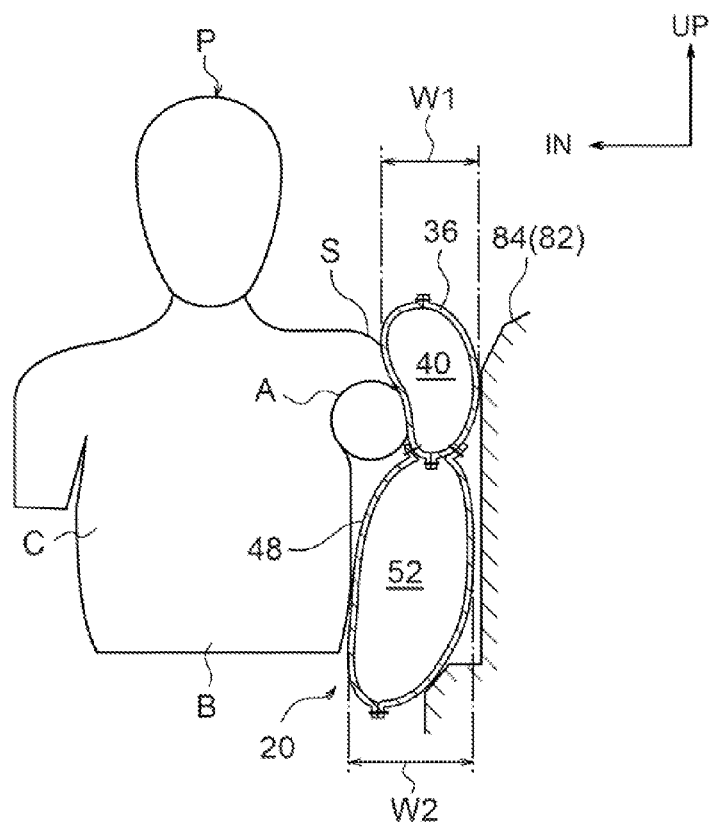
FIG. 9 is a cross-section illustrating a cross-section taken along line F9-F9 in FIG. 1.
Figure 10:
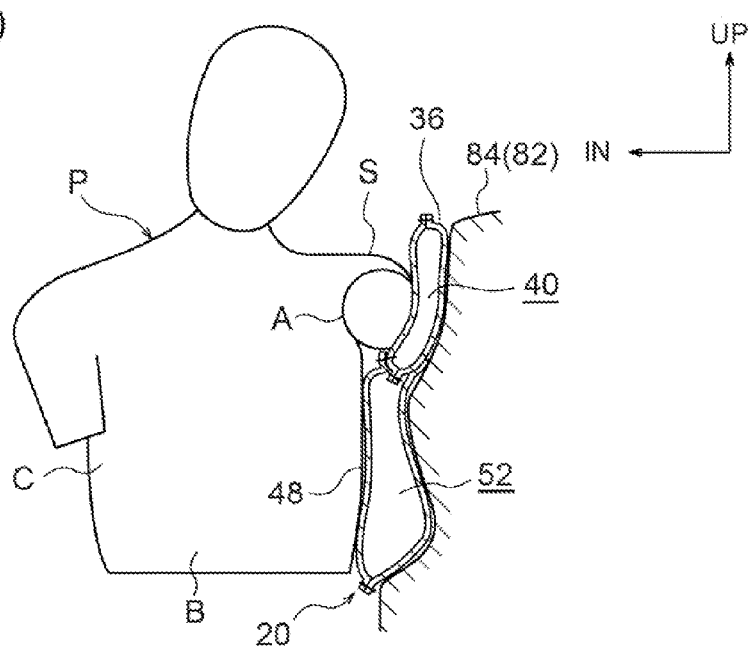
FIG. 10 is a cross-section corresponding to FIG. 9, illustrating a state in which the side-airbag is compressed between a seated occupant and a door trim, due to impact from a side face collision.

As illustrated in FIG. 1, the side-airbag device 10 according to the present exemplary embodiment is mounted to a door-side side portion 14A of a seatback 14 of a vehicle seat 12 (a side portion at the side of a side door 82 illustrated in FIG. 9 and FIG. 10). The seatback 14 is reclinably coupled to a rear end portion of a seat cushion 16, and a headrest 18 is coupled to an upper end portion of the seatback 14.

Note that in the present exemplary embodiment, the front-rear direction, the left-right direction (width direction), and the up-down direction of the vehicle seat 12 respectively correspond to the front-rear direction, the left-right direction (width direction), and the up-down direction of the vehicle. In FIG. 1, a World Side Impact Dummy (WorldSID) P is seated in the vehicle seat 12 instead of an actual occupant. The seated posture of the World Side Impact Dummy P is specified in Side Barrier Impact Test Protocol (ECE R95) currently used in Japan and Europe, and Side Barrier Impact Test Protocol (FMVSS 214) currently used in the US. Moreover, the tilt angle (reclining angle) of the seatback 14 with respect to the seat cushion 16 is set at a standard set position corresponding to the seated posture. For ease of explanation, the World Side Impact Dummy P is hereafter referred to as "seated occupant P" below.

The side-airbag device 10 includes a side-airbag 20, and an inflator 22 serving as a gas generation means for generating gas inside the side-airbag 20. The side-airbag 20 is folded and disposed inside the door-side side portion 14A in a state unitized together with the inflator 22 and the like, and inflates and deploys between the seated occupant P and a vehicle body side portion due to pressure from gas generated by the inflator 22 (the state illustrated in FIG. 1). Configuration is such that during such inflation and deployment, a seatback pad 24 installed at the door-side side portion 14A (see FIG. 8) and a stitched portion of a seat covering material, not illustrated in the drawings, that covers the seatback pad 24 split open due to the inflation pressure of the side-airbag 20. Note that the front-rear and up-down directions of the side-airbag 20 described in the below explanation are directions of the side-airbag 20 in an inflated and deployed state, and substantially correspond to the front-rear and up-down directions of the vehicle.

As illustrated in FIG. 1 to FIG. 5, the side-airbag 20 is configured by a main bag section 26 and a sub-bag section 28. In the main bag section 26, for example, one base cloth 30 formed of a cutout of nylon-based or polyester-based cloth is folded in two along a fold line L1 (see FIG. 6) and a peripheral edge portion thereof is stitched at stitched portions T1, T2, such that one end side (the upper end side in the inflated and deployed state) is formed in an opened bag shape.

Figure 2:
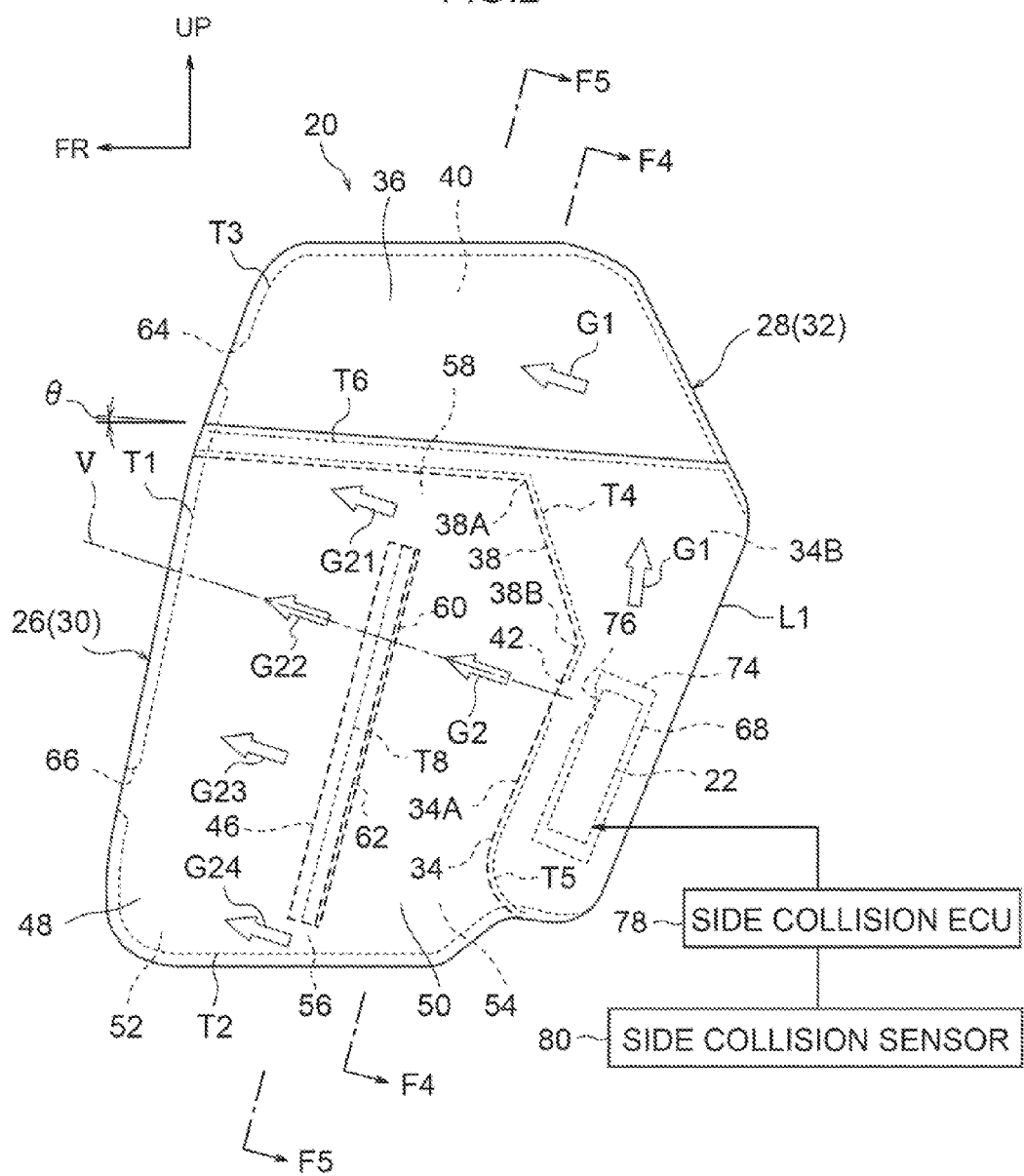
FIG. 2 is an enlarged side view illustrating the same side-airbag enlarged.
Figure 3:
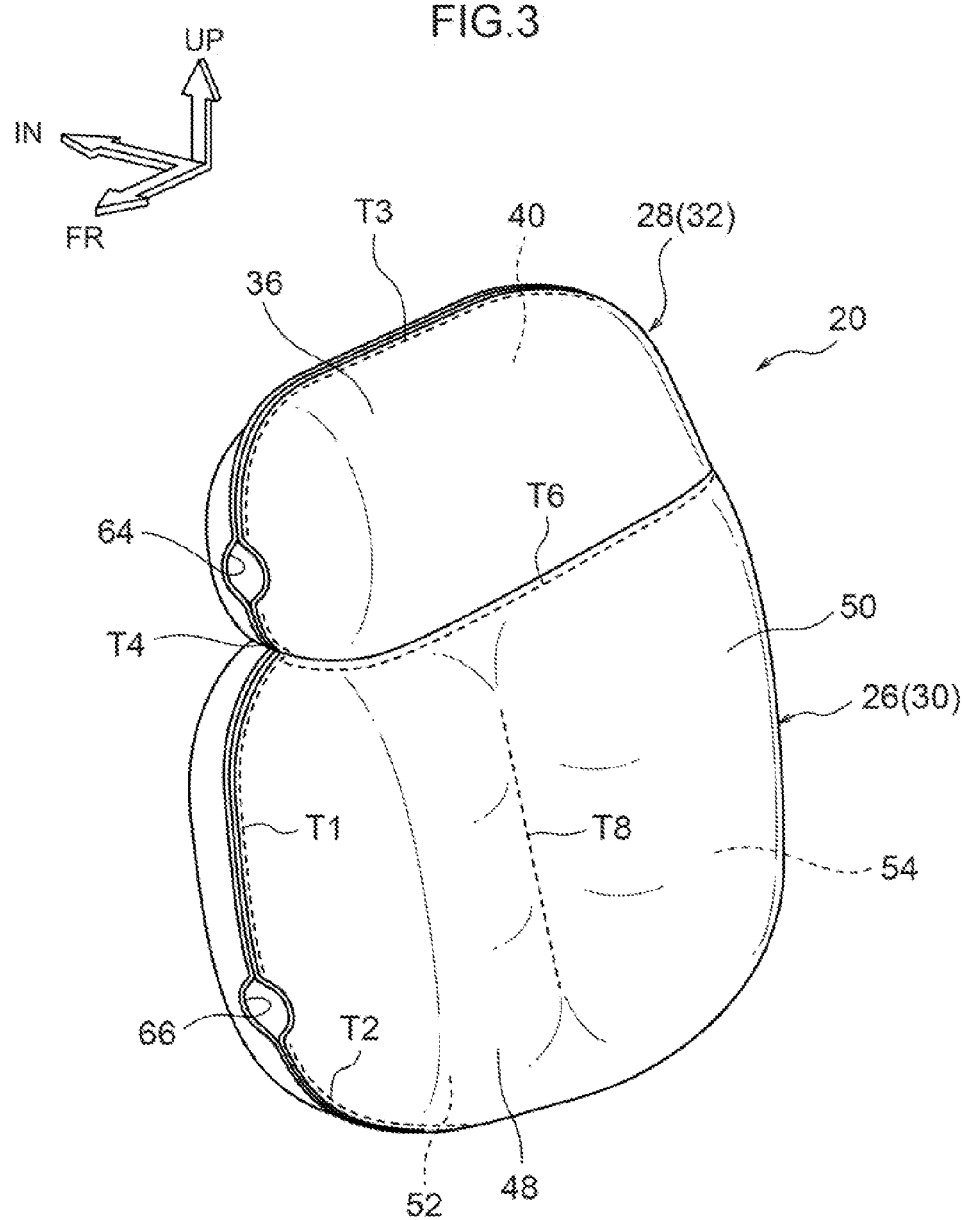
FIG. 3 is an enlarged perspective view illustrating the same side-airbag enlarged.
Figure 4:
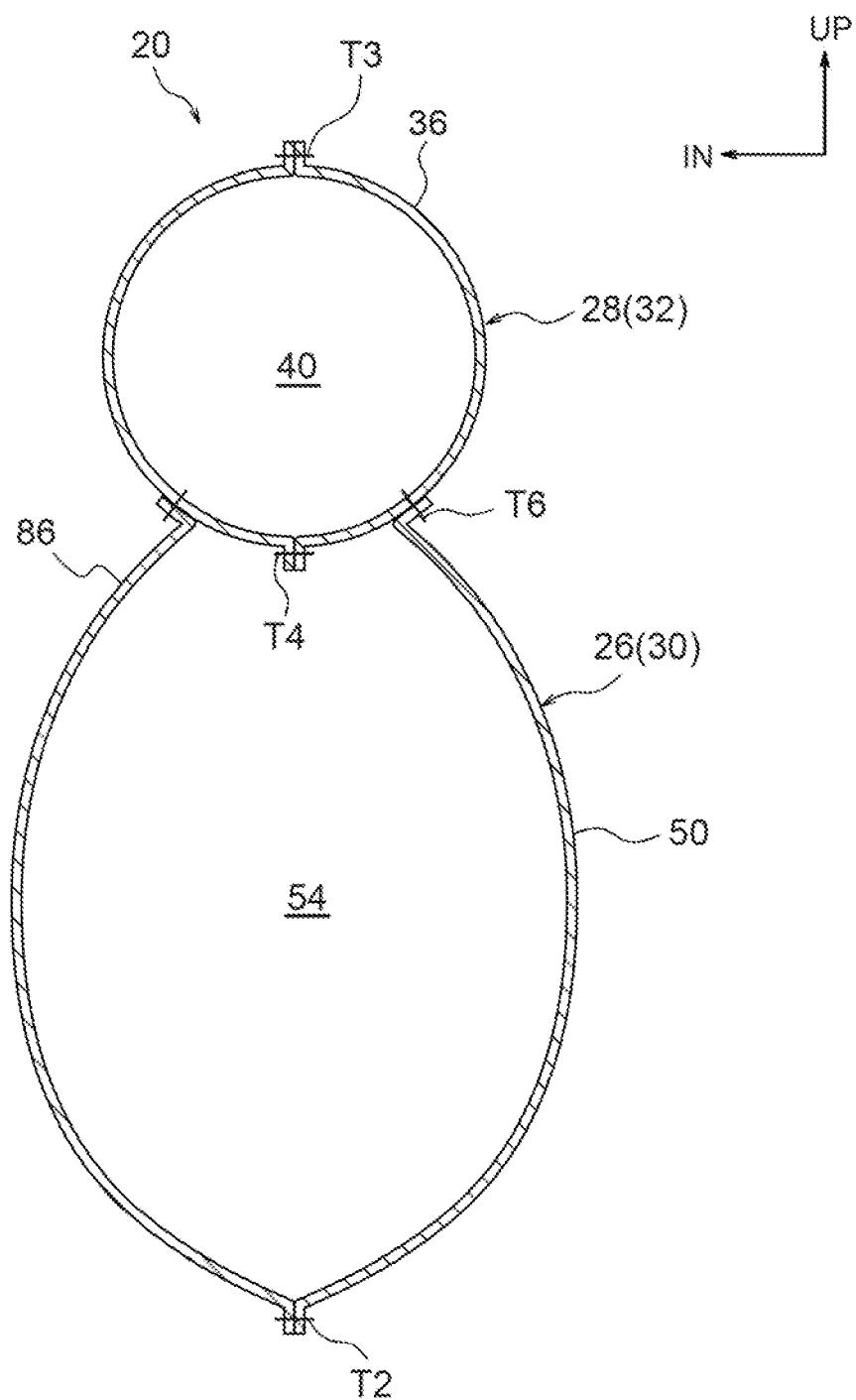
FIG. 4 is an enlarged cross-section illustrating a cross-section taken along line F4-F4 in FIG. 2.

In the sub-bag section 28, a base cloth 32 formed of a similar cloth to the base cloth 30 (see FIG. 7) is folded in two along a fold line L2, and a peripheral edge portion thereof is stitched at stitched portions T3, T4, T5, thereby forming a substantially inverted L shaped bag shape. As illustrated in FIG. 1 and FIG. 2, the sub-bag section 28 is configured by an inner tube 34 extending in the inflated and deployed state in the seatback height direction (substantially the up-down direction), a shoulder bag section (upper bag portion) 36 extending from an upper end portion of the inner tube 34 toward the vehicle front side, and a brace portion 38 inflated and deployed in a brace shape between the inner tube 34 and the shoulder bag section 36.

The inside of the shoulder bag section 36 configures a shoulder chamber 40, and a lower portion side of the inner tube 34 configures an inflator housing portion 34A for housing the inflator 22. An upper portion side of the inner tube 34 configures a gas introduction portion 34B to the shoulder chamber 40. The gas introduction portion 34B is formed such that by providing the brace portion 38 the front-rear direction dimension increases toward an upper end side, and the inflator housing portion 34A and the shoulder chamber 40 are placed in communication through the gas introduction portion 34B. In an inflated and deployed state of the side-airbag 20, the brace portion 38 is configured such that an upper end 38A is positioned further toward the vehicle front side than a lower end 38B.

In the sub-bag section 28 described above, the inner tube 34 and the brace portion 38 are inserted inside a rear end side of the main bag section 26, and a lower end portion of the shoulder bag section 36 is stitched to an upper end edge of the main bag section 26 at a stitched portion T6. The main bag section 26 and the sub-bag section are thereby integrally joined together, and an upper end opening of the main bag section 26 is blocked by the sub-bag section 28.

The main bag section 26 interior and the sub-bag section 28 interior are separated from each other by the stitched portions T4, T5 of the sub-bag section 28. However, a gas supply port (opening) 42 is formed in the vicinity of an up-down direction center portion of the inner tube 34, and the inner tube 34 interior and the main bag section 26 interior (a rear chamber 54, described later) are placed in communication with each other through the gas supply port 42. The gas supply port 42 is formed by providing an unstitched portion between the stitched portion T4 and the stitched portion T5.

Figure 5:
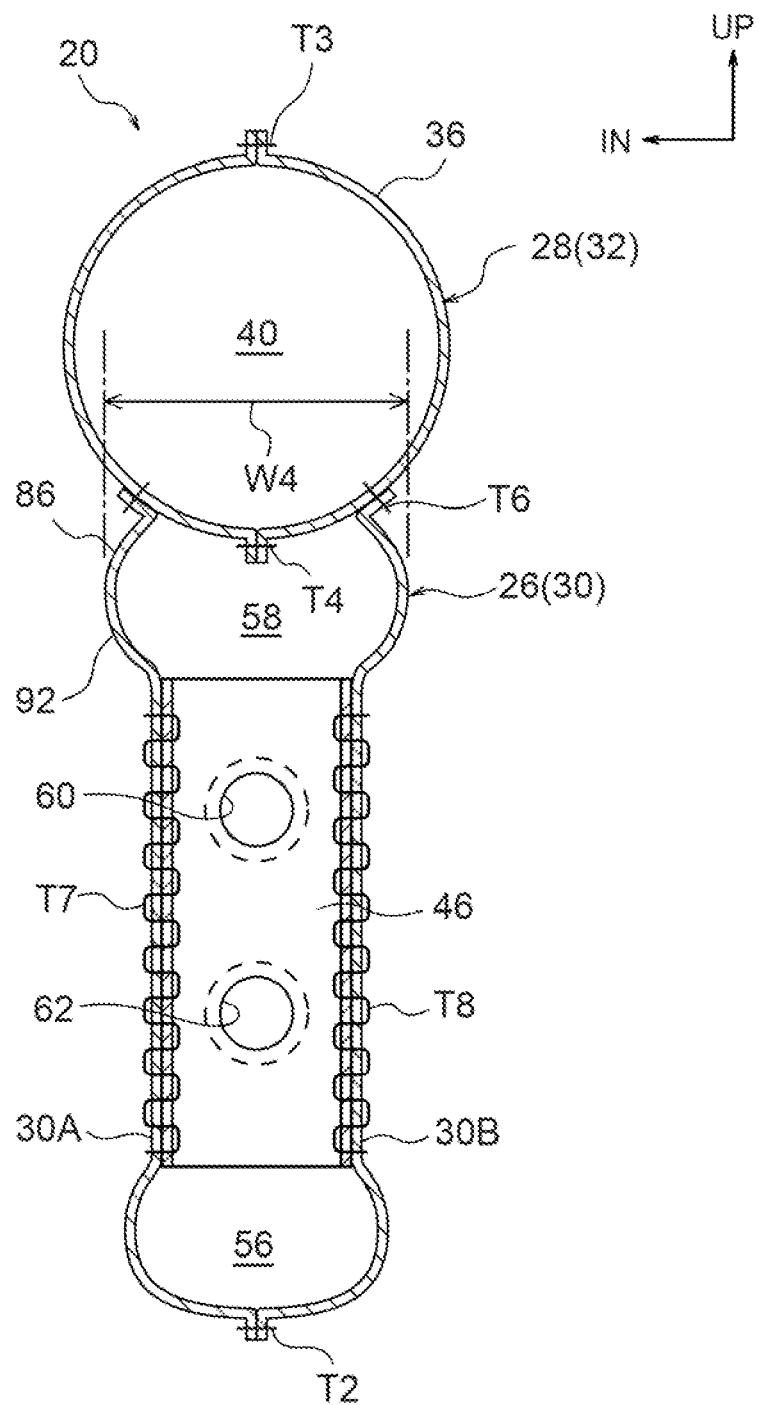
FIG. 5 is an enlarged cross-section illustrating a cross-section taken along line F5-F5 in FIG. 2.

A tether (strap: partitioning cloth) 46 is provided inside the main bag section 26. The tether 46 is formed in an elongated rectangular shape using a similar material to the base cloths 30, 32, for example, and as illustrated in FIG. 5 and FIG. 8, one length end edge portion is stitched to one side portion 30A of the base cloth 30 at a stitched portion T7 (see FIG. 6), and the other length end edge portion is stitched to the other side portion 30B of the base cloth 30 at a stitched portion T8 (see FIG. 6). In an inflated and deployed state of the side-airbag 20, the tether 46 is provided so as to extend in the seatback height direction (substantially the up-down direction), and the main bag section 26 is separated into a front bag section 48 and a rear bag section 50 by the tether 46. The front bag section 48 inside configures a front chamber 52, and the rear bag section 50 interior configures the rear chamber 54. The front chamber 52 and the rear chamber 54 are partitioned front and rear by the tether 46.

However, as illustrated in FIG. 2 and FIG. 5, a lower side communicating portion (gap) 56 is formed between a lower end portion of the tether 46 and a lower end portion of the main bag section 26, and the front chamber 52 and the rear chamber 54 are placed in communication with each other through the lower side communicating portion 56. Similarly, an upper side communicating portion (gap) 58 is formed between an upper end portion of the tether 46 and the shoulder bag section 36, and the front chamber 52 and the rear chamber 54 are placed in communication with each other through the upper side communicating portion 58.

Plural (two in this case) circular shaped openings (vent holes) 60, 62 are formed to the tether 46, aligned in a row along the up-down direction (length direction), and the front chamber 52 and the rear chamber 54 are placed in communication with each other through the openings 60, 62. As illustrated in FIG. 2, in a state in which the side-airbag 20 is inflated and deployed, the upper side opening 60 is provided so as to be positioned along the same straight line (hypothetical line) V as the gas supply port 42 previously described.

A vent hole (shoulder chamber discharge hole) 64 is formed at a lower portion side of the front end edge of the shoulder bag section 36, placing the shoulder chamber 40 and the outside of the side-airbag 20 in communication with each other. The vent hole 64 is formed by providing an unstitched portion between the stitched portion T3 and the stitched portion T4.

Similarly, a vent hole (front chamber discharge hole) 66 is formed at a lower portion side of the front end edge of the front bag section 48, placing the front chamber 52 and the outside of the side-airbag 20 in communication with each other. The vent hole 66 is formed by providing an unstitched portion between the stitched portion T1 and the stitched portion T2. In a state in which the side-airbag 20 is inflated and deployed, the vent hole 66 is disposed in a position offset below the lower side opening 62 formed to the tether 46, and offset above the lower side communicating portion 56.

The inflator 22 is what is referred to as a cylinder type inflator, and is formed in a circular column shape. The inflator 22 is housed inside a bottomed circular tube shaped diffuser 68, and is coaxial thereto. The inflator 22 is fixed to the diffuser 68 by crimping a portion of the diffuser 68. As illustrated in FIG. 1, the inflator 22 and the diffuser 68 are housed inside the inflator housing portion 34A previously described, in a state in which the axial direction runs along the height direction of the seatback 14, and an opening portion of the diffuser 68 faces toward the upper side.

A pair of upper and lower stud bolts 70 protrudes from an outer peripheral portion of the diffuser 68 toward the vehicle width direction inner side (see FIG. 8). The stud bolts 70 pass through the base cloths 30, 32 and a side frame 15A of a seatback frame 15, and nuts 72 are screwed onto leading end sides thereof. The diffuser 68 is thereby fastened and fixed, together with the side-airbag 20, to the side frame 15A. Gas ejection ports 74, 76 are formed to the diffuser 68 at an upper end portion and at a position facing the gas supply port 42, respectively. The gas ejection port 76 facing the gas supply port 42 is formed so as to be disposed on the straight line V previously described in an inflated and deployed state of the side-airbag 20.

As illustrated in FIG. 2, the inflator 22 described above is electrically connected to a side collision ECU 78 mounted to the vehicle. The side collision ECU 78 is electrically connected to a side collision sensor 80 for detecting a side face collision. The side collision ECU 78 is configured so as to operate the inflator 22 in the event of detecting the (inevitability of) a side face collision based on a signal from the side collision sensor 80. In cases in which a pre-crash sensor that predicts (foresees) a side face collision is electrically connected to the side collision ECU 78, a configuration may be employed in which the side collision ECU 78 operates the inflator 22 when a side face collision is predicted, based on the signal from the pre-crash sensor.

When the inflator 22 is operated, gas ejected from a gas ejection hole, not illustrated in the drawings, provided at the inflator 22 is ejected from the gas ejection ports 74, 76 of the diffuser 68. Gas G1 ejected from the gas ejection port 74 of the diffuser 68 passes through the gas introduction portion 34B of the inner tube 34 and is supplied to the shoulder chamber 40. The shoulder bag section 36 is thereby quickly inflated and deployed.

Gas G2 ejected from the gas ejection port 76 of the diffuser 68 passes through the gas supply port 42 of the inner tube 34 and is supplied to the rear chamber 54. The rear bag section 50 is thereby quickly inflated and deployed. The gas G2 supplied to the rear chamber 54 passes the upper side communicating portion 58, the lower side communicating portion 56, and the upper and lower openings 60, 62 formed to the tether 46, and is supplied to the front chamber 52 (see arrows G21, G22, G23, and G24 in FIG. 2). The front bag section 48 is thereby inflated and deployed. Detailed explanation follows regarding the side-airbag 20 in the inflated and deployed state.

As illustrated in FIG. 9, in the inflated and deployed state of the side-airbag 20, the side-airbag 20 is present between the seated occupant P and a door trim 84 (a vehicle body side portion) of the side door 82. As illustrated in FIG. 1 and FIG. 2, in this state, the shoulder bag section 36 is inflated and deployed so as to extend from the side of a shoulder S of the seated occupant P toward the vehicle front side, and the front bag section 48 and the rear bag section 50 are inflated and deployed so as to be aligned in a row along the front-rear direction at a lower side of the shoulder bag section 36. In this state, the shoulder bag section 36 is in a state extending from an upper portion of the seatback 14 of the shoulder bag section 36 (an upper portion when the seatback 14 is divided into three equal portions, these being the upper portion, an up-down direction intermediate portion, and a lower portion). The front bag section 48 inflates and deploys at the side of the front side of the chest C and abdomen B of the seated occupant P, and the rear bag section 50 inflates and deploys at the side of the rear side of the chest C and abdomen B of the seated occupant P. The inner tube 34 inflates and deploys so as to extend along the vehicle up-down direction at the rear side of the rear bag section 50, and the brace portion 38 inflates and deploys in a braced state between an upper end side of the inner tube 34 and a rear end side of the front bag section 48.

As illustrated in FIG. 9, an inflated thickness (vehicle width direction dimension: the same applies below) W1 of the shoulder bag section 36 is set smaller than an inflated thickness W2 of the front bag section 48. As illustrated in FIG. 8, an inflated thickness W3 of the rear bag section 50 is set larger than the inflated thickness W2 of the front bag section 48. Namely the inflated thickness of the side-airbag 20 in the inflated and deployed state is set with a relationship W3>W2>W1. FIG. 10 illustrates a state in which the side-airbag 20 is compressed between the seated occupant P and the door trim 84 due to impact from a side face collision. In the present exemplary embodiment, the above dimensional relationship of the inflated thickness of the side-airbag 20 is set through the up-down width dimension of the shoulder bag section 36 in a deployed but not inflated state, and the stitching position of the tether 46 to the main bag section 26.

By setting the inflated thickness W1 of the shoulder bag section 36 smaller than the inflated thickness W2 of the front bag section 48 as described above, as illustrated in FIG. 11, a vehicle width direction inner side face at an upper end side of the front bag section 48 configures a curved upper arm-push-up face 86 that rises on progression toward the vehicle width direction outer side. The upper arm-push-up face 86 may be configured sloped so as to rise on progression toward the vehicle width direction outer side.

In the side-airbag 20, a boundary between the shoulder bag section 36 and the main bag section 26, namely the stitched portion T6 (see FIG. 2: not illustrated in FIG. 1), is formed so as to be positioned below a center O of the shoulder S of the seated occupant P, and above an underarm U of the seated occupant P, as viewed from the vehicle width direction. Specifically, the stitched portion T6 is positioned aligned along a row along the vehicle width direction with a lower end of a core member, not illustrated in the drawings, provided at the shoulder S of the seated occupant P, namely, the World Side Impact Dummy P.

Figure 12:
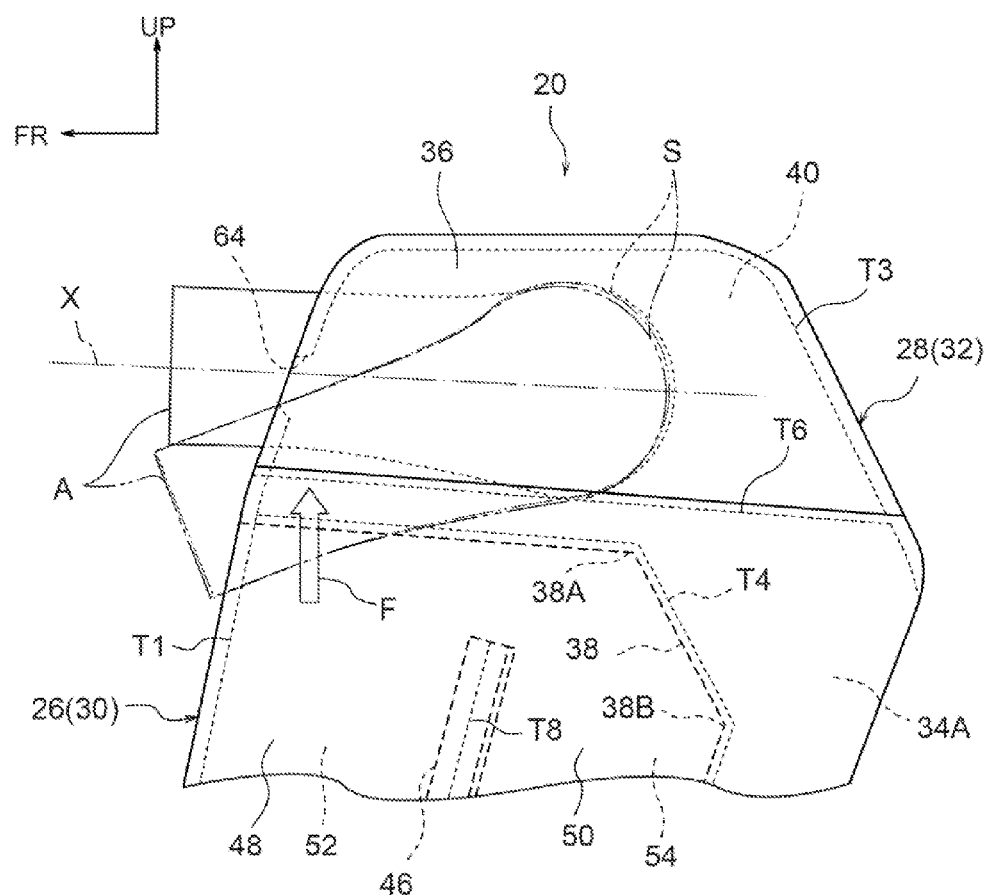
FIG. 12 is a side view to explain a situation when an upper arm of a seated occupant is pushed upward due to making sliding contact with a main bag section.

As illustrated in FIG. 2 and FIG. 12, in a state in which the seatback 14 is positioned at the standard setting position previously described, the stitched portion T6 is formed so as to slope upward toward the front with respect to the vehicle front-rear direction. Note that θ illustrated in FIG. 2 indicates the slope angle of the stitched portion T6 with respect to the vehicle front-rear direction. The up-down width dimension of the shoulder bag section 36 is set so as to decrease on progression toward the vehicle front side in a deployed but not inflated state, and as illustrated in FIG. 12, the shoulder bag section 36 inflates and deploys in a substantially circular cone shape, with the axial line X sloping upward and forward with respect to the vehicle front-rear direction.

As illustrated in FIG. 1 and FIG. 8, in the side-airbag 20, the vehicle front-rear direction boundary between the front bag section 48 and the rear bag section 50, namely the tether 46, is formed so as to face a front-rear direction intermediate portion (the front-rear direction center portion, or in the vicinity of the front-rear direction center portion) at a side face of the chest portion C of the seated occupant P. In plan view as illustrated in FIG. 8, a recessed portion 90 that forms a recess toward the vehicle width direction outer side is formed at a vehicle width direction inner side side face of the side-airbag 20 at the side of tether 46. The recessed portion 90 is configured so as to face a front-rear direction intermediate portion at the side face of the chest portion C (namely, the portion that projects out the most toward the vehicle width direction outer side).

In the side-airbag 20, the capacity of the shoulder bag section 36 is set sufficiently smaller than the capacity of the main bag section 26, and by prioritizing supply of gas ejected from the inflator 22 to the shoulder chamber 40, the internal pressure of the shoulder bag section 36 in inflated and deployed state is configured so as to be higher than the internal pressure of the main bag section 26 (the internal pressure of both the front bag section 48 and the rear bag section 50).

As illustrated in FIG. 5, in the side-airbag 20, the opening surface area of the upper side communicating portion 58 is set greater than that of the lower side communicating portion 56, in vehicle front-rear direction view with the side-airbag 20 in the inflated and deployed state. Configuration thereby increases an inflated thickness W4 of an underarm restraint region 92, a portion of the main bag section 26 above the tether 46, promoting inflation and deployment of the underarm restraint region 92.

Operation and Advantageous Effects

Explanation follows regarding operation and advantageous effects of the present exemplary embodiment.

In the side-airbag device 10 with the above configuration, when the side collision ECU 78 detects a side face collision by a signal from the side collision sensor 80, the inflator 22 is operated by the side collision ECU 78. Gas ejected from the inflator 22 is supplied inside the side-airbag 20, and the side-airbag 20 inflates and deploys between the seated occupant P and the door trim 84 of the side door 82.

The side-airbag 20 is partitioned into the shoulder bag section 36 extending from the side of the shoulder S of the seated occupant P toward the vehicle front side in the inflated and deployed state, and the main bag section 26 positioned at the side of the chest portion C and the abdominal portion B of the seated occupant P, and the inflated thickness (vehicle width direction dimension) of the shoulder bag section 36 is set lower than the main bag section 26. In the inflated and deployed state, the vehicle width direction inner side face at the upper end side of the main bag section 26 thereby configures the upper arm-push-up face 86, curving such that the vehicle width direction inner side face rises on progression toward the vehicle width direction outer side (see FIG. 11).

Figure 11:
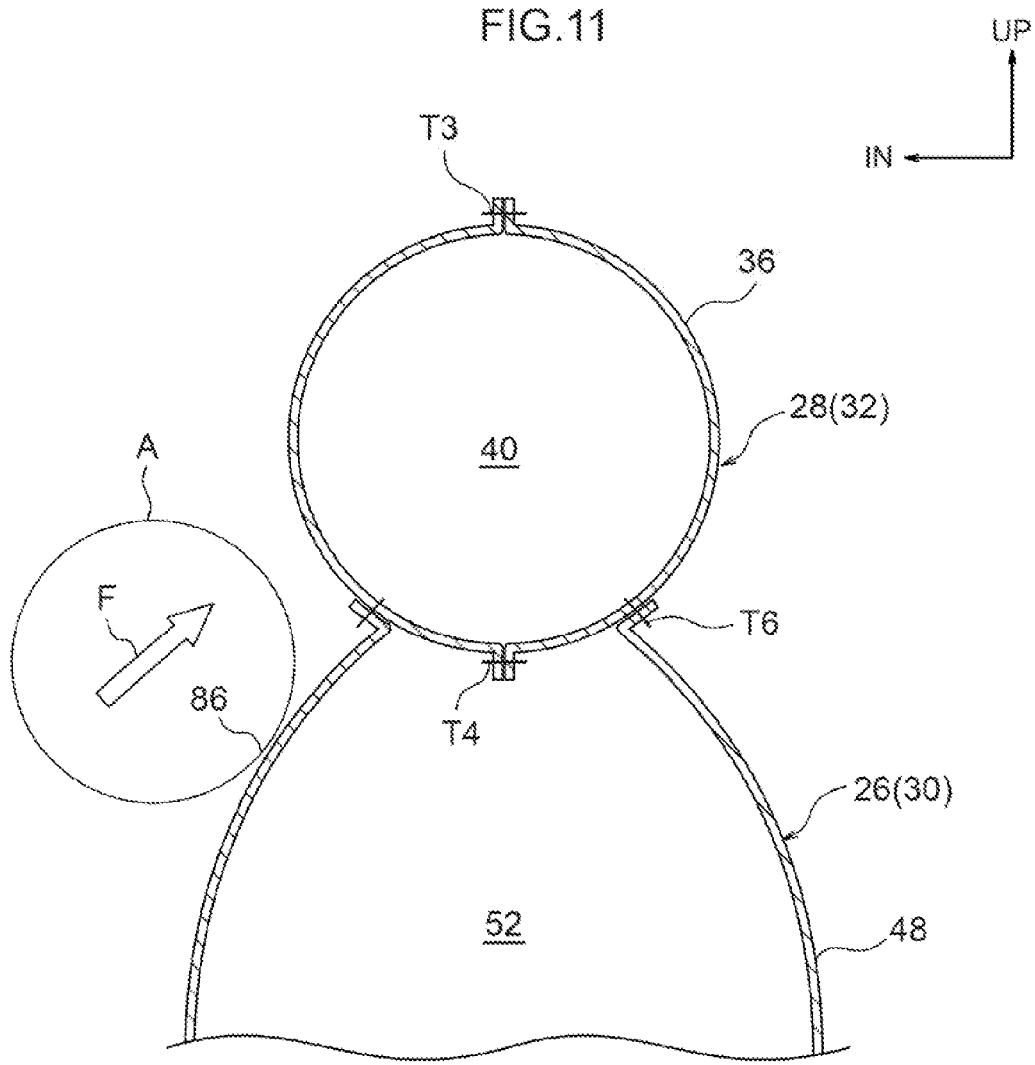
FIG. 11 is a cross-section to explain a situation when an upper arm of a seated occupant is pushed upward due to making sliding contact with a main bag section.

The side-airbag 20 and the seated occupant P approach each other relatively due to the impact of a side face collision, and the upper arm-push-up face 86 and an upper arm A of the seated occupant P thereby make sliding contact, generating a force F that pushes the upper arm A upward (see FIG. 11 and FIG. 12). The upper arm A is thereby pushed upward above the main bag section 26, and restrained by the shoulder bag section 36. The upper arm A can thereby be inhibited from coming between the chest C of the seated occupant P and the side-airbag 20.

The shoulder bag section 36 inflates and deploys so as to extend from the shoulder S side of the seated occupant P toward the vehicle front side, as previously described. This enables configuration in which the shoulder S of the seated occupant P does not separate from the shoulder bag section 36, even, for example, in cases in which the side face collision mode is an oblique side face collision, and the seated occupant P has moved under inertia obliquely toward the vehicle front. This enables the shoulder S of the seated occupant P to be well restrained by the side-airbag 20, and enables restraint of the shoulder S to be maintained as far as the latter part of the collision, regardless of the side face collision mode.

In the present exemplary embodiment, the main bag section 26 is partitioned into the front bag section 48 and the rear bag section 50 that are aligned in a row along the vehicle front-rear direction in the inflated and deployed state. This enables the front side of the chest C and the abdomen B of the seated occupant P that have relatively low resilience to be restrained by the front bag section 48, and the rear side of the chest C and the abdomen B that have relatively high resilience to be restrained by the rear bag section 50. Moreover, as previously described, the shoulder S and the upper arm A that have relatively high resilience can be restrained by the shoulder bag section 36. This enables the body (upper body) of the seated occupant P to be suitably restrained by the shoulder bag section 36, the front bag section 48, and the rear bag section 50 that are set corresponding to a high level of resilience.

As illustrated in FIG. 8, the side face of the chest C and the abdomen B of the seated occupant P can be restrained by being covered from the front and rear along the curved portion of the front bag section 48 and the rear bag section 50. This enables the positional relationship in the vehicle front-rear direction between the chest C, the abdomen B, and the side-airbag 20 to be stabilized.

In the present exemplary embodiment, since the tether 46 is provided at the vehicle front-rear direction boundary between the front bag section 48 and the rear bag section 50, the recessed portion 90 forming a recess toward the vehicle width direction outer side is formed at the vehicle width direction inner side face of the side-airbag 20 in the vicinity of the boundary. Since the recessed portion 90 faces the front-rear direction intermediate portion of the side face of the chest C and the abdomen B (namely, a portion that projects out the most toward the vehicle width direction outer side), the load on the chest C and the abdomen B (such as the ribs) can be reduced. Moreover, fitting the front-rear direction intermediate portion of the side face of the chest C and the abdomen B into the recessed portion 90 enables the positional relationship in the vehicle front-rear direction between the chest C, the abdomen B and the side-airbag 20 to be further stabilized.

In the present exemplary embodiment, since the stitched portion T6 partitioning the shoulder bag section 36 and the main bag section 26 is set at the boundary between the shoulder bag section 36 and the main bag section 26, in the inflated and deployed state the vehicle width direction inner side face of the side-airbag 20 in the vicinity of the boundary forms a recess toward the vehicle width direction outer side. This enables the upper arm-push-up face 86 to curve greatly so as to rise on progression toward the vehicle width direction outer side. Moreover, in the inflated and deployed state of the side-airbag 20, the boundary is positioned below the center of the shoulder S and above the underarm U of the seated occupant P, as viewed from the vehicle width direction. The side-airbag 20 and the seated occupant P approach each other relatively due to the impact of a side face collision, and the upper arm-push-up face 86 thereby makes sliding contact with a lower side portion at the side face of the shoulder S, generating a force that pushes the shoulder S upward. Since the shoulder S can be pushed upward in this way (see the state illustrated by an intermittent line in FIG. 1), the upper arm A can be assisted in being pushed upward.

In the present exemplary embodiment, in an inflated and deployed state of the side-airbag 20, the internal pressure of the shoulder bag section 36 restraining the shoulder S that has relatively high resilience is configured to be higher than the internal pressure of the main bag section 26 (the internal pressure of both the front bag section 48 and the rear bag section 50) restraining the chest C and the abdomen B that have relatively low resilience. This enables sites on the body of the seated occupant P that have relatively high resilience to be effectively restrained, while reducing load at sites that have relatively low resilience. This enables occupant restraint performance by the side-airbag 20 to be improved.

In the present exemplary embodiment, the vehicle width direction dimensions (inflated thickness) of the side-airbag 20 in the inflated and deployed state are set with the relationship "rear bag section 50>front bag section 48>shoulder bag section 36: W3>W2>W1". This enables restraint corresponding to the level of load resilience on the body of the seated occupant P to be controlled not only by setting the internal pressure, by also by setting the inflated thickness of the side-airbag 20. Namely, this enables the rear side of the chest C and the abdomen B that have relatively high resilience to be restrained by the rear bag section 50 that has greater inflated thickness than the front bag section 48, and the front side of the chest C and the abdomen B that have relatively low resilience to be restrained by the front bag section 48. This enables occupant restraint by the side-airbag 20 to be further improved. Moreover, setting the inflated thickness of the front bag section 48 greater than that of the shoulder bag section 36 enables the vehicle width direction inner side face at the upper end side of the front bag section 48 (the upper arm-push-up face 86) to curve greatly so as to rise on progression toward the vehicle width direction outer side. This enables behavior to push the upper arm A upward to be assisted.

In the present exemplary embodiment, the vent holes 64, 66 are formed to the shoulder bag section 36 and the front bag section 48, respectively, for externally discharging gas supplied inside. Individually changing the setting of the sizes of the vent holes 64, 66 enables easy adjustment of the internal pressures of the shoulder bag section 36 and the front bag section 48, independently of each other. Since the vent holes 64, 66 are provided distanced up and down at a front edge portion of the side-airbag 20, the gas discharged from the vent holes 64, 66 can be prevented from concentrating at one location. The seated occupant P is therefore less liable to be affected by the high temperature gas.

In the present exemplary embodiment, since the inflator 22 is provided inside the inner tube 34 that places the shoulder bag section 36 interior and the rear bag section 50 interior in communication with each other, gas generated by the inflator 22 can be smoothly supplied to the shoulder bag section 36 interior and the rear bag section 50 interior. This enables the shoulder bag section 36 and the rear bag section 50 to be quickly inflated and deployed, and enables the shoulder S and the rear side of the chest C and the abdomen B that have relatively high resilience to be quickly restrained. Moreover, since the front bag section 48 inside and the rear bag section 50 interior are placed in communication with each other through the upper side communicating portion 58 and the lower side communicating portion 56, gas supplied to the rear bag section 50 interior can be smoothly supplied to the front bag section 48 inside, enabling inflation and deployment of the front bag section 48 to be promoted.

Furthermore, the opening surface area of the upper side communicating portion 58 is set larger than the lower side communicating portion 56 in vehicle front-rear direction view with the side-airbag 20 in the inflated and deployed state. This enables the inflated thickness of the portion of the main bag section 26 above the tether 46 (the underarm restraint region 92) to be increased, and enables deployment of the underarm restraint region 92 to be promoted. This enables, for example, the vicinity of the underarm of the upper arm A of the seated occupant P to be restrained by the underarm restraint region 92, enabling the upward pushing behavior of the upper arm A to be assisted.

In the present exemplary embodiment, gas generated by the inflator 22 is supplied to the rear bag section 50 interior through the gas ejection port 76 formed to the diffuser 68, and the gas supply port 42 formed to the inner tube, and supplied to the front bag section 48 inside through the openings 60, 62 etc. formed to the tether 46. Since in the inflated and deployed state the gas ejection port 76, the gas supply port 42 and the opening 60 are aligned in a row on the straight line V with the side-airbag 20, gas generated by the inflator 22 can be smoothly supplied to the front bag section 48 inside through the inside of the rear bag section 50. This enables deployment performance of the front bag section 48 during initial operation of the inflator 22 (the first part of a collision) to be improved.

Moreover, the vent hole 66 for externally discharging gas inside the front bag section 48 is formed to the end edge portion at the vehicle front side of the front bag section 48 in the inflated and deployed state, and the vent hole 66 is formed in an offset position below the opening 62 formed to the tether 46. This enables gas supplied to the front bag section 48 through the opening 62 formed to the tether 46 to be inhibited from being directly (linearly) externally discharged through the vent hole 66, thereby enabling the internal pressure of the front bag section 48 to be prevented from becoming too high, while still improving the initial deployment performance of the front bag section 48.

Figure 13:
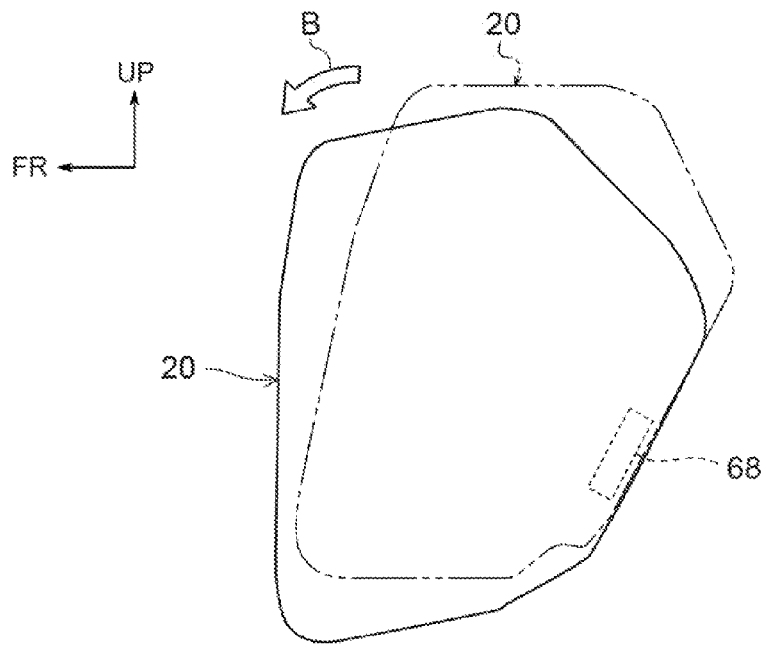
FIG. 13 is a schematic view to explain nodding behavior of a side-airbag.

In the present exemplary embodiment, supply of gas from the inflator 22 provided inside the inner tube 34 is prioritized to the shoulder bag section 36 extending from the upper end portion of the inner tube 34 toward the vehicle front side with the side-airbag 20 in the inflated and deployed state. When the internal pressure of the shoulder bag section 36 rises more than the internal pressure of the front bag section 48, the possibility might arise that a front portion side of the shoulder bag section 36 displaces to the lower side, pushing the front bag section 48 down toward the lower side. When the connecting portion between the shoulder bag section 36 and the inner tube 34 bends as a result, as illustrated by the solid line in FIG. 13, the overall behavior of the entire side-airbag 20 would be nodding (swinging toward the lower side about the inflator 22, see the arrow B in FIG. 13) making it difficult to deploy the side-airbag 20 according to a set deployment position (the position illustrated by a double-dotted dashed line in FIG. 13). However, in the present exemplary embodiment, the brace shaped brace portion 38 is inflated and deployed between the shoulder bag section 36 and the inner tube, thereby enabling folding of the connecting portion to be prevented or effectively inhibited by the brace portion 38. This enables the deployment position of the side-airbag 20 to be stabilized.

In the present exemplary embodiment, the up-down width dimension of the shoulder bag section 36 in the deployed but not inflated state is set to decrease on progression toward the vehicle front side, such that the shoulder bag section 36 narrows on progression toward the vehicle front side in the inflated and deployed state. This enables improved deployment performance of the shoulder bag section 36 into a narrow gap between the shoulder S of the seated occupant P and the door trim 84, and enables good imposition of the shoulder bag section 36 into the gap. This enables unintended interference of the upper arm A with the front portion side of the shoulder bag section 36 to be avoided when the upper arm A of the seated occupant P is pushed up by making sliding contact with the upper arm-push-up face 86, enabling the upper arm A to be pushed upward smoothly.

In the present exemplary embodiment, the stitched portion T6 set at the upper end of the main bag section 26 slopes upward toward the front with respect to the vehicle front-rear direction in a state in which the seatback 14 is positioned in the standard setting position, and the side-airbag 20 is in the inflated and deployed state. This enables the acting point of an upward pushing force F, acting on the upper arm A of the seated occupant P by making sliding contact with a vehicle width direction inner side face at the upper end side of the main bag section 26 (the upper arm-push-up face 86), to be set further to the vehicle front side. This enables the upward pushing direction moment acting on the upper arm A to be increased, such that the upper arm A can be pushed upward even more favorably.

The shoulder bag section 36 is inflated and deployed in a substantially circular conical shape that narrows on progression toward the front end side of the side-airbag 20, with the axial line X of the shoulder bag section 36 (see FIG. 12) sloped upward toward the front with respect to the vehicle front-rear direction. A curved face at the upper portion side of the vehicle width direction inner side face of the shoulder bag section 36 thereby slopes upward toward the front along the axial line X. In a case in which the seated occupant P moves under inertia obliquely toward the vehicle front due to impact from an oblique side face collision, the shoulder S of the seated occupant P makes sliding contact with the curved face of the shoulder bag section 36, thereby pushing the shoulder S upward. This enables pushing upward of the upper arm A to be assisted.

Supplementary Explanation of First Exemplary Embodiment

In the first exemplary embodiment, the upper end of the main bag section 26 (the stitched portion T6) is configured so as to slope upward toward the front with respect to the vehicle front-rear direction in a state in which the seatback 14 is positioned in the standard setting position and the side-airbag 20 is in the inflated and deployed state; however the present invention is not limited thereto. For example, the upper end of the main bag section 26 may be configured along the vehicle front-rear direction (to extend horizontally).

In the first exemplary embodiment, the up-down width dimension of the shoulder bag section 36 in the deployed but not inflated state is configured set to decrease on progression toward the vehicle front side; however the present invention is not limited thereto, and the up-down dimension of the shoulder bag section 36 may be configured uniformly set.

In the first exemplary embodiment, the brace shaped brace portion 38 is configured to inflate and deploy between the shoulder bag section 36 and the inner tube 34; however the present invention is not limited thereto, and a configuration may be applied in which the brace portion 38 is omitted.

In the first exemplary embodiment, the gas supply port 42 of the inner tube 34, the gas ejection port 76 of the diffuser 68, and the opening 60 of the tether 46 are configured aligned in a row along the same straight line V with the side-airbag 20 in the inflated and deployed state; however the present invention is not limited thereto, and the positions of the gas supply port of the inner tube, the gas ejection portion of the diffuser, and the opening of the tether may be changed as appropriate. Similar applies to the positions of the vent holes.

In the first exemplary embodiment, the upper side communicating portion 58 and the lower side communicating portion 56 are configured provided above and below the tether 46; however the present invention is not limited thereto, and configuration may be applied in which one or other, or both, of the upper side communicating portion and the lower side communicating portion is omitted. Moreover, the relationship of the opening surface area of the upper side communicating portion 58 and the lower side communicating portion 56 in vehicle front-rear direction view with the side-airbag 20 in the inflated and deployed state is not limited to the configuration of the first exemplary embodiment, and may be changed as appropriate.

In the first exemplary embodiment, the side-airbag 20 is configured provided with the inner tube 34; however the present invention is not limited thereto, and a configuration may be applied in which a flow-smoothing cloth, diffuser or the like is employed instead of an inner tube in order to distribute gas from the inflator to the shoulder bag section interior and the main bag section interior.

In the first exemplary embodiment, the vent holes 64, 66 are formed to the shoulder bag section 36 and the main bag section 26, respectively; however the present invention is not limited thereto, and a configuration may be applied in which one or both of the vent holes 64, 66 are omitted.

In the first exemplary embodiment, the internal pressure of the shoulder bag section 36 is configured higher than the internal pressure of the main bag section 26 with the side-airbag 20 in the inflated and deployed state; however the present invention is not limited thereto, and the settings of the internal pressure of each bag portion may be changed as appropriate. For example, the internal pressure of each bag portion may be configured equal.

In the first exemplary embodiment, the inflated thickness W3 of the rear bag section 50 is configured greater than the inflated thickness W2 of the front bag section 48; however the present invention is not limited thereto, and the inflated thickness of the front bag section may be configured greater than the inflated thickness of the rear bag section.

In the first exemplary embodiment, the vehicle front-rear direction boundary between the front bag section 48 and the rear bag section 50 (the tether 46) with the side-airbag 20 in the inflated and deployed state is configured to face the front-rear direction intermediate portion of the chest C of the seated occupant P; however the present invention is not limited thereto, and the position of the boundary may be changed as appropriate. Similar applies to the position of the boundary between the shoulder bag section 36 and the main bag section 26.

In the above exemplary embodiment, the main bag section 26 is configured partitioned into the front bag section 48 and the rear bag section 50; however the present invention is not limited thereto, and the main bag section 26 inside may be configured without being partitioned into front and rear.

The above supplementary explanation similarly applies to other exemplary embodiments of the present invention explained below. Note that, in the below exemplary embodiments, the same reference numerals as the first exemplary embodiment are appended and explanation thereof is omitted for configuration and operation that is basically the same as the first exemplary embodiment.

Second Exemplary Embodiment

Figure 14:
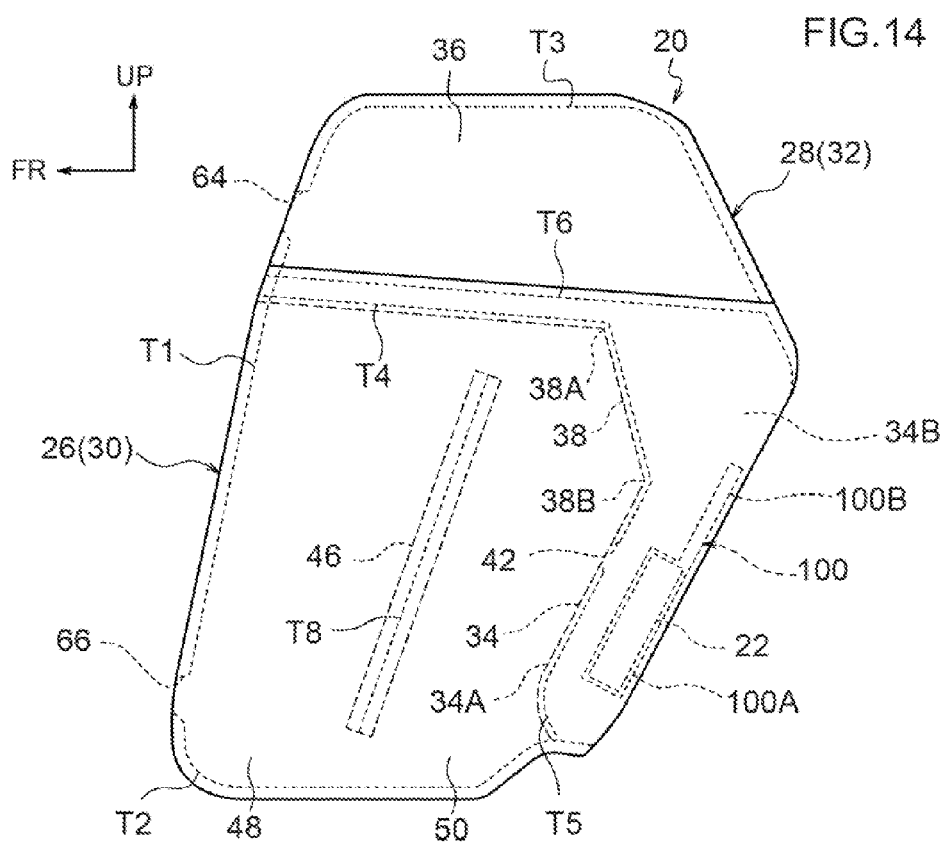
FIG. 14 is a side view illustrating an inflated and deployed state of a side-airbag that is a configuration member of a vehicle side-airbag device according to a second exemplary embodiment of the present invention.

FIG. 14 illustrates a side view of a side-airbag 20 in the inflated and deployed state that is a configuration member of a vehicle side-airbag device according to a second exemplary embodiment of the present invention. In this side-airbag device, configuration of a diffuser 100 differs to the diffuser 68 according to the first exemplary embodiment. The diffuser 100 is configured by a main body portion 100A that has similar configuration to the diffuser 68, and an extension portion 100B (a supporting portion) that extends from an upper end of the main body portion 100A along a rear end edge of the inner tube 34 toward the upper side. An upper end of the extension portion 100B is positioned further to the upper side than the lower end 38B of the brace portion 38, and further to lower side than the upper end 38A of the brace portion 38.

Figure 15:
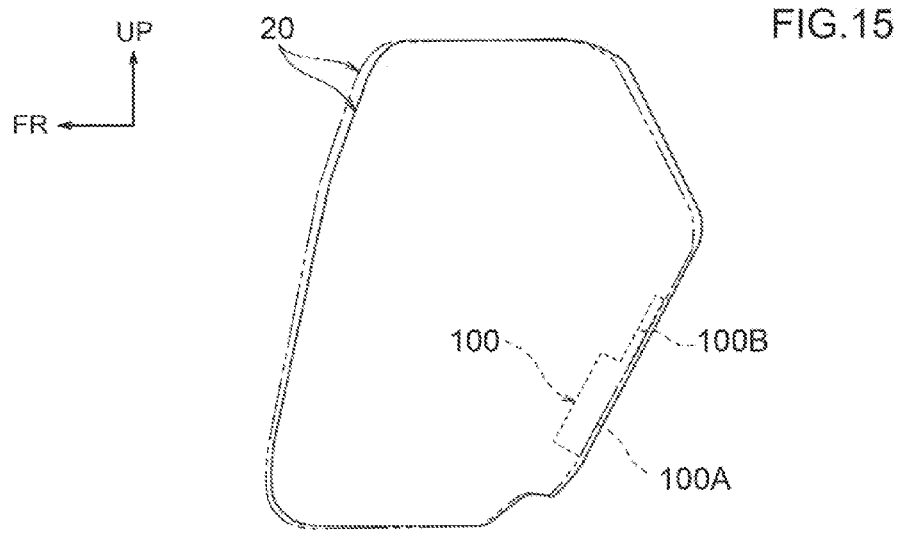
FIG. 15 is a schematic view to explain a situation in which nodding behavior of a side-airbag is inhibited by an extension portion provided at a diffuser of the same side-airbag device.

Other configuration in the present exemplary embodiment is similar to the configuration of the first exemplary embodiment. Similarly to the first exemplary embodiment, therefore, the nodding behavior of the side-airbag 20 (see FIG. 13) can be prevented or effectively inhibited by the brace portion 38 provided at the sub-bag section 28. Moreover, in the present exemplary embodiment, the rear end edge of the inner tube 34 is supported from the vehicle front side, further to the upper side than the lower end 38B of the brace portion 38, by the extension portion 100B provided at the diffuser 100 (see FIG. 15). This enables bending of the inner tube 34 at the vicinity of the connecting portion of the lower end 38B of the brace portion 38 and the inner tube 34 to be prevented or effectively inhibited when the front portion side of the shoulder bag section 36 attempts to displace toward the lower side. This enables more favorable stabilization of the deployment position of the side-airbag 20.

Third Exemplary Embodiment

Figure 16:
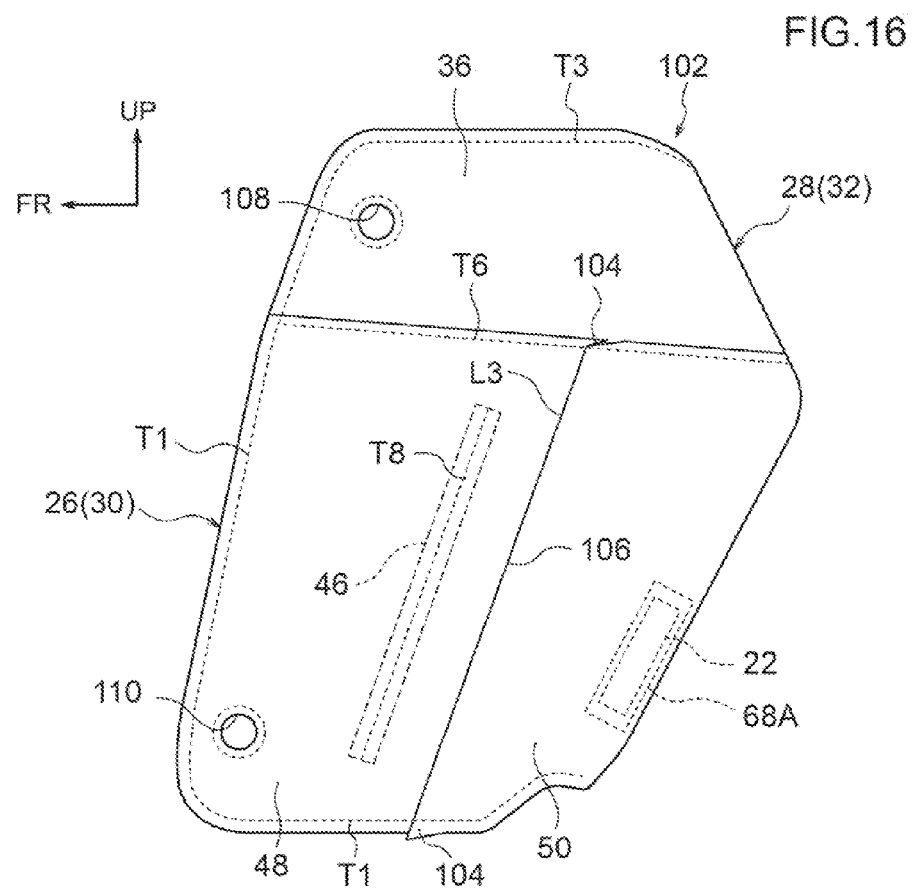
FIG. 16 is a side view illustrating a deployed but not inflated state of a side-airbag that is a configuration member of a vehicle side-airbag device according to the second exemplary embodiment of the present invention.

FIG. 16 illustrates a side view of a side-airbag 102 in a deployed but not inflated state that is a configuration member of a vehicle side-airbag device according to a third exemplary embodiment of the present invention. The side-airbag 102 differs to the side-airbag 20 according to the first exemplary embodiment in that a pair of upper and lower tuck portions 104 (folded back portions: pleated portions) is provided at the rear bag section 50. The tuck portions 104 are folded along a fold line L3 along a portion of the base cloth 30 configuring the rear bag section 50 running along the up-down direction on a plane facing the vehicle width direction in an inflated and deployed state of the rear bag section 50. The upper and lower end portions of the folded portions are respectively formed by stitching at the stitched portions T1, T6. Excess length portions 106 are thereby formed between the pair of tuck portions 104. Note that, although in the present exemplary embodiment, the pair of tuck portions 104 and the excess length portions 106 are formed to both vehicle width direction side faces of the rear bag section 50 in the inflated and deployed state, they may be configured formed to only one vehicle width direction side face.

Moreover, in the side-airbag 102, the vent holes 64, 66 according to the first exemplary embodiment are omitted. A circular hole shaped vent hole 108 is formed instead, at a front end side of a face of the shoulder bag section 36 facing the vehicle width direction outer side in the inflated and deployed state. Similarly, a circular hole shaped vent hole 110 is formed at a front end side and lower end side of a face of the front bag section 48 facing the vehicle width direction outer side in the inflated and deployed state. Note that, although illustration of the inner tube 34 and the brace portion 38 is omitted in FIG. 16, other configuration is similar to the configuration of the first exemplary embodiment.

Figure 17:
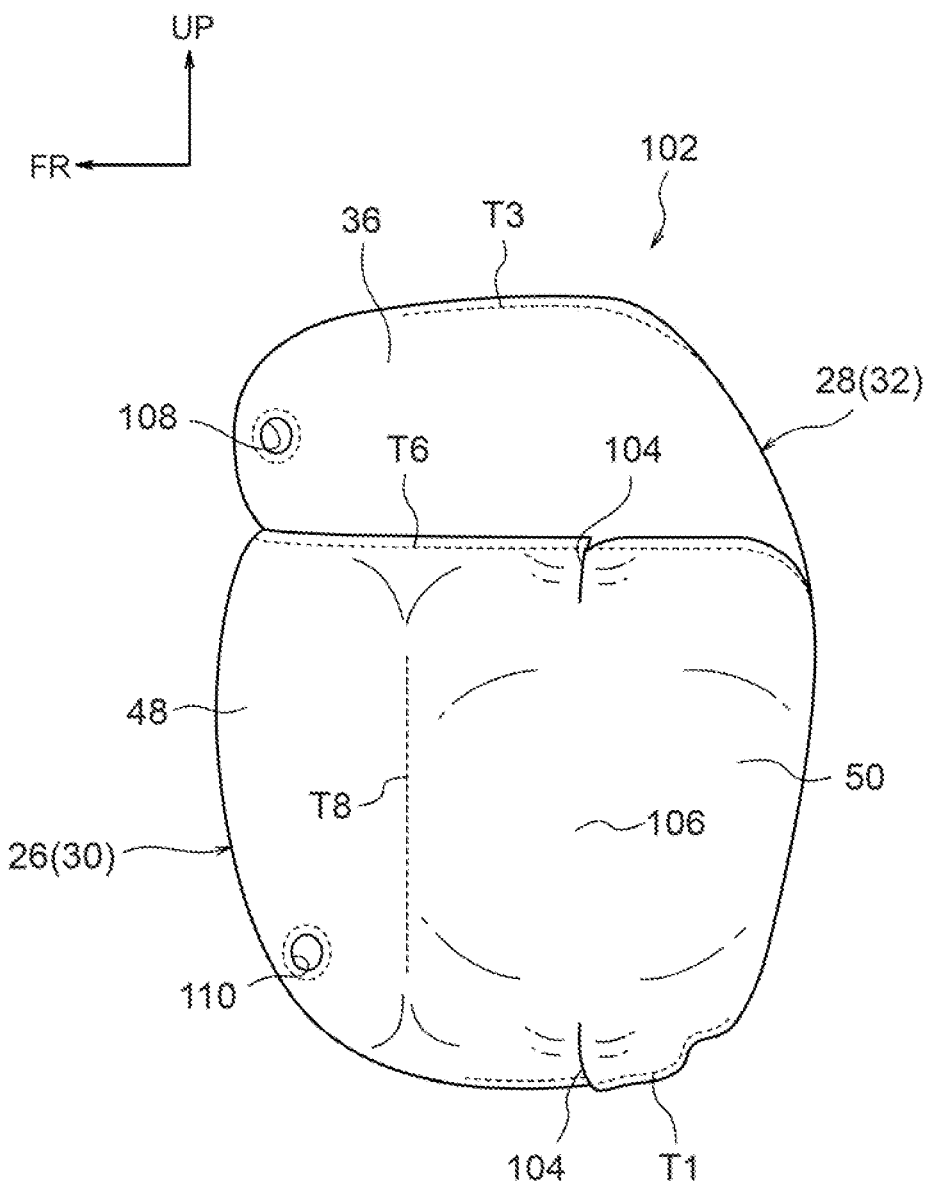
FIG. 17 is perspective view illustrating an inflated and deployed state of the same side-airbag.

In the present exemplary embodiment, as illustrated in FIG. 17, when the rear bag section 50 is inflated and deployed, the excess length portion 106 between the pair of tuck portions 104 extends, thereby increasing the vehicle width direction dimension (inflated thickness) of the rear bag section 50. Since the inflated thickness of the rear bag section 50 increases due to the tuck portions 104 in this way, there is no need to change the vehicle front-rear direction dimension of the rear bag section 50 in the inflated and deployed state, or to change the position of the boundary between the front bag section 48 and the rear bag section 50, in order to increase the inflated thickness of the rear bag section 50. This enables the degrees of freedom for design of the side-airbag 102 to be improved.

Moreover, since in the present exemplary embodiment the vent holes 108, 110 are formed to the respective faces of the shoulder bag section 36 and the front bag section 48 facing the vehicle width direction outer side in the inflated and deployed state, the seated occupant P is less liable to be affected by the high temperature gas discharged from the vent holes 108, 110.

Note that in the third exemplary embodiment, the tuck portions 104 are configured formed to both upper and lower end sides of the rear bag section 50; however the present invention is not limited thereto, and a configuration may be applied in which a tuck portion is formed to only one of the upper end side or the lower end side of the rear bag section 50.

Various other modifications may be implemented within the scope of the invention without departing from the spirit thereof. Obviously the scope of rights of the present invention is not limited to these embodiments.

The invention claimed is:

1. A vehicle side-airbag device comprising:
 an inflator that is provided at a vehicle seat and is operated to generate gas in cases in which a side face collision of the vehicle is detected or predicted;
 a side-airbag that is provided at a side portion of a seatback of the vehicle seat, that inflates and deploys between a seated occupant and a vehicle body side portion due to gas generated by the inflator being supplied inside the side-airbag, and that is partitioned in an inflated and deployed state, into a shoulder bag section extending from a side of a shoulder of the seated occupant toward a vehicle front and a main bag section positioned at a side of a chest and abdomen of the seated occupant, the main bag section being further partitioned into a front bag section and a rear bag section aligned in a row along a vehicle front-rear direction; and
 an inner tube provided at the side-airbag so as to be positioned at a vehicle rear side of the rear bag section in the inflated and deployed state, with the inflator provided inside the inner tube that is in communication with the shoulder bag section interior and the rear bag section interior, wherein
 a vehicle width direction dimension of the shoulder bag section is set smaller than that of the main bag section in the inflated and deployed state, such that a vehicle width direction inner side face at an upper end side of the main bag section forms an upper arm-push-up face that is sloped or curved so as to rise on progression toward a vehicle width direction outer side.

2. The vehicle side-airbag device of claim 1, wherein:
 the shoulder bag section and the main bag section are partitioned by a tether or a stitched portion extending in the inflated and deployed state along the vehicle front-rear direction; and
 a boundary between the shoulder bag section and the main bag section in the inflated and deployed state is formed so as to be positioned further to a lower side than a center of the shoulder of the seated occupant and further to an upper side than an underarm of the seated occupant as viewed from the vehicle width direction.

3. The vehicle side-airbag device of claim 2, wherein:
 the front bag section and the rear bag section are partitioned by a tether or a stitched portion extending in the inflated and deployed state along the vehicle up-down direction; and
 a boundary between the front bag section and the rear bag section in the inflated and deployed state is formed so to face a front-rear direction intermediate portion of the chest of the seated occupant.

4. The vehicle side-airbag device of claim 2, wherein the vehicle width direction dimension of the rear bag section is set greater than that of the front bag section in the inflated and deployed state, and the vehicle width direction dimension of the front bag section is set greater than that of the shoulder bag section in the inflated and deployed state.

5. The vehicle side-airbag device of claim 2, wherein the side-airbag is configured such that an internal pressure of the shoulder bag section is higher than an internal pressure of the main bag section in the inflated and deployed state.

6. The vehicle side-airbag device of claim 1, wherein:
 the front bag section and the rear bag section are partitioned by a tether or a stitched portion extending in the inflated and deployed state along a vehicle up-down direction; and
 a boundary between the front bag section and the rear bag section in the inflated and deployed state is formed so as to face a front-rear direction intermediate portion of the chest of the seated occupant.

7. The vehicle side-airbag device of claim 6, wherein the vehicle width direction dimension of the rear bag section is set greater than that of the front bag section in the inflated and deployed state, and the vehicle width direction dimension of the front bag section is set greater than that of the shoulder bag section in the inflated and deployed state.

8. The vehicle side-airbag device of claim 6, wherein the side-airbag is configured such that an internal pressure of the shoulder bag section is higher than an internal pressure of the main bag section in the inflated and deployed state.

9. The vehicle side-airbag device of claim 1, wherein a vehicle width direction dimension of the rear bag section is set greater than that of the front bag section in the inflated and deployed state, and the vehicle width direction dimension of the front bag section is set greater than that of the shoulder bag section in the inflated and deployed state.

10. The vehicle side-airbag device of claim 9, wherein the side-airbag is configured such that an internal pressure of the shoulder bag section is higher than an internal pressure of the main bag section in the inflated and deployed state.

11. The vehicle side-airbag device of claim 1, wherein the side-airbag is configured such that an internal pressure of the shoulder bag section is higher than an internal pressure of the main bag section in the inflated and deployed state.

12. The vehicle side-airbag device of claim 1, wherein a vent hole is formed at both the shoulder bag section and the main bag section to externally discharge gas that has been supplied inside.

13. The vehicle side-airbag device of claim 1, wherein:
 an upper portion of the inner tube configures a gas introduction portion to the shoulder bag section interior, a gas supply port at the rear bag section interior is formed at an up-down direction intermediate portion of the inner tube, and both upper end sides and lower end sides of the front bag section interior and the rear bag section interior are in communication with each other.

14. The vehicle side-airbag device of claim 13, wherein:
 the front bag section and the rear bag section are partitioned by a tether extending along the vehicle up-down direction in the inflated and deployed state;
 the inflator is housed inside a diffuser provided inside the inner tube, and the gas supply port, a gas ejection port formed at the diffuser, and an opening formed at the tether are aligned in the inflated and deployed state in a row along a same straight line; and a vent hole that externally discharges gas inside the front bag section is formed at a vehicle front side end edge portion of the front bag section in the inflated and deployed state at an offset position below the opening.

15. The vehicle side-airbag device of claim 1, wherein:
the front bag section and the rear bag section are partitioned by a tether extending along the vehicle up-down direction in the inflated and deployed state;

an upper side communicating portion is provided between an upper end portion of the tether and the shoulder bag section and places the upper end side of the front bag section and the upper end side of the rear bag section in communication with each other, and a lower side communicating portion is provided between a lower end portion of the tether and a lower end portion of the main bag section and places the lower end side of the front bag section and the lower end side of the rear bag section in communication with each other; and an opening surface area of the upper side communicating portion is set larger than the lower side communicating portion in the inflated and deployed state as viewed in the vehicle front-rear direction.

16. The vehicle side-airbag device of claim 1, wherein:
the shoulder bag section extends in the inflated and deployed state from an upper end portion of the inner tube extending along the vehicle up-down direction toward the vehicle front side; and a brace shaped brace portion is inflated and deployed between the shoulder bag section and the inner tube.

17. The vehicle side-airbag device of claim 16, wherein:
the inflator is housed inside a diffuser provided inside the inner tube; and the diffuser is fixed to a seatback frame provided at the seatback, and includes a supporting portion that supports a rear end edge of the inner tube further to the upper side than a lower end of the brace portion.

18. The vehicle side-airbag device of claim 1, wherein a pair of upper and lower tuck portions are formed at the rear bag section by folding back on each other in the vehicle front-rear direction both upper and lower end sides of a face of the rear bag section facing the vehicle width direction in the inflated and deployed state, and stitching.

19. The vehicle side-airbag device of claim 1, wherein the up-down width dimension of the shoulder bag section in a deployed but not inflated state is set so as to decrease on progression toward the vehicle front side.

20. The vehicle side-airbag device of claim 1, wherein, in a state in which the seatback is positioned in a standard setting position and the side-airbag is in the inflated and deployed state, the side-airbag is formed such that an upper end of the main bag section slopes upward toward the front with respect to the vehicle front-rear direction.

\* \* \* \* \*